(12) United States Patent
Kobayashi

(10) Patent No.: US 7,515,141 B2
(45) Date of Patent: Apr. 7, 2009

(54) COORDINATE INPUT APPARATUS, CONTROL METHOD THEREFOR, AND PROGRAM

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 468 days.

(21) Appl. No.: 11/398,936

(22) Filed: Apr. 5, 2006

(65) Prior Publication Data
US 2006/0232830 A1  Oct. 19, 2006

(30) Foreign Application Priority Data
Apr. 15, 2005 (JP) ............................... 2005-118980

(51) Int. Cl.
*G06F 3/041* (2006.01)
(52) U.S. Cl. .................. 345/173; 345/174; 345/175; 178/18.01; 178/18.06; 178/19.03
(58) Field of Classification Search ......... 345/173–183, 345/204–215; 178/18.01–18.09, 19.01–19.07
See application file for complete search history.

(56) References Cited

U.S. PATENT DOCUMENTS

| | | | |
|---|---|---|---|
| 4,507,557 A | 3/1985 | Tsikos | |
| 6,429,856 B1 | 8/2002 | Omura et al. | |
| 6,570,103 B1 | 5/2003 | Saka et al. | |
| 6,608,619 B2 | 8/2003 | Omura et al. | |
| 2005/0200613 A1* | 9/2005 | Kobayashi et al. | 345/175 |
| 2006/0232568 A1* | 10/2006 | Tanaka et al. | 345/175 |
| 2006/0232792 A1* | 10/2006 | Kobayashi | 356/621 |

FOREIGN PATENT DOCUMENTS

| | | |
|---|---|---|
| JP | 3-244017 A | 10/1991 |
| JP | 2000-105671 A | 4/2000 |
| JP | 2001-142642 A | 5/2001 |
| JP | 2002-055770 A | 2/2002 |
| JP | 2003-303046 A | 10/2003 |

\* cited by examiner

*Primary Examiner*—Vijay Shankar
(74) *Attorney, Agent, or Firm*—Canon U.S.A., Inc., IP Division

(57) ABSTRACT

A position pointed on a coordinate input region is detected by using first and second sensor units provided in the vicinities of both ends of one side of a coordinate input region, and angle information representing directions of shadows, which are areas light-shielded by pointing performing by two pointing instructions. The shadows are detected according to a light amount distribution, which is obtained from optical units of the first and second sensor units. Additionally, the coordinates of positions located by the two pointing instructions can be calculated by using 1) a combination of pieces of angle information on the shadows detected by a combination of the optical units of the different sensor units and 2) a combination of pieces of angle information on the shadows detected by a combination of the optical units of the same sensor units.

17 Claims, 27 Drawing Sheets

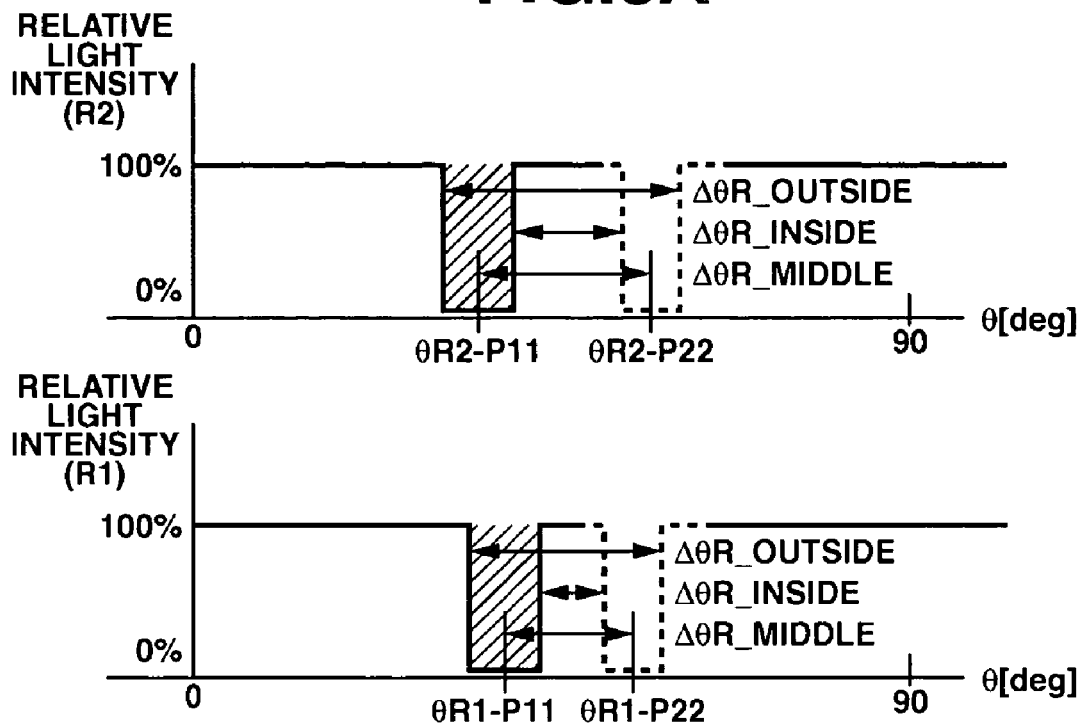
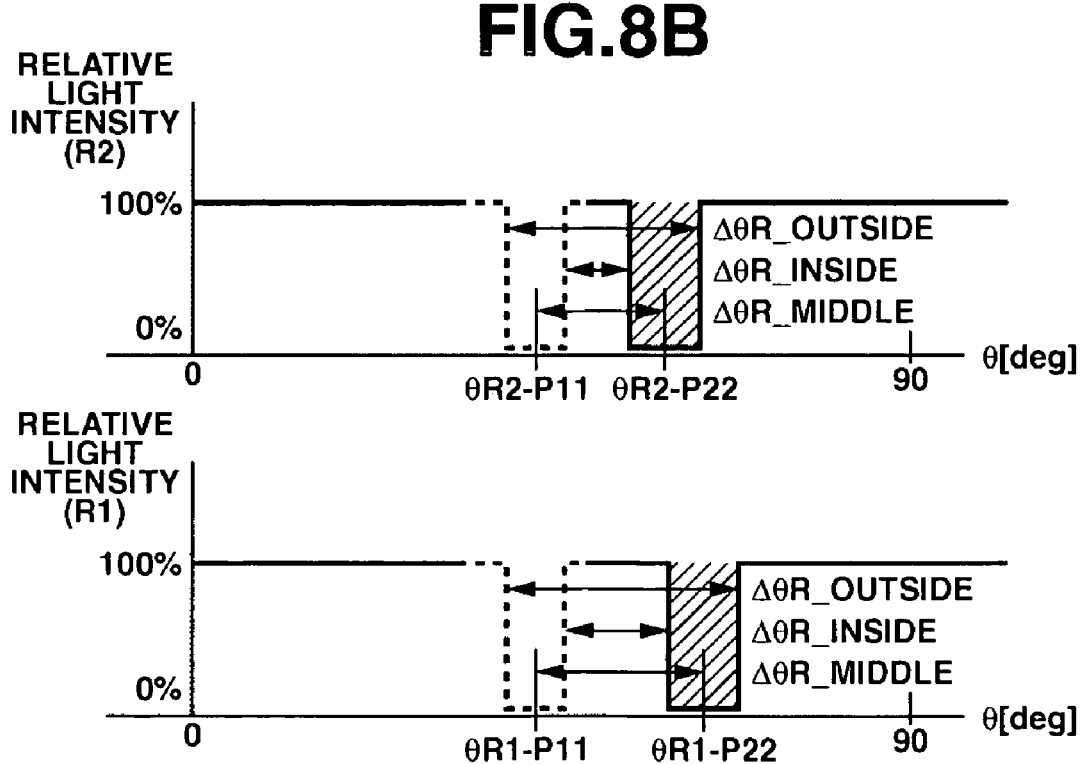

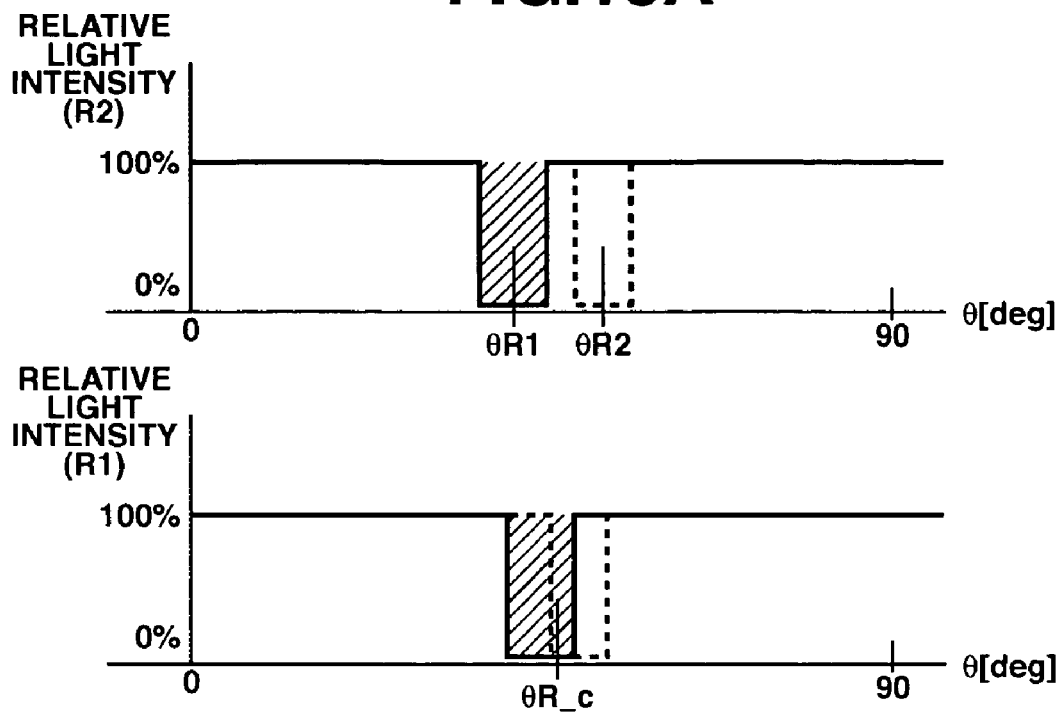
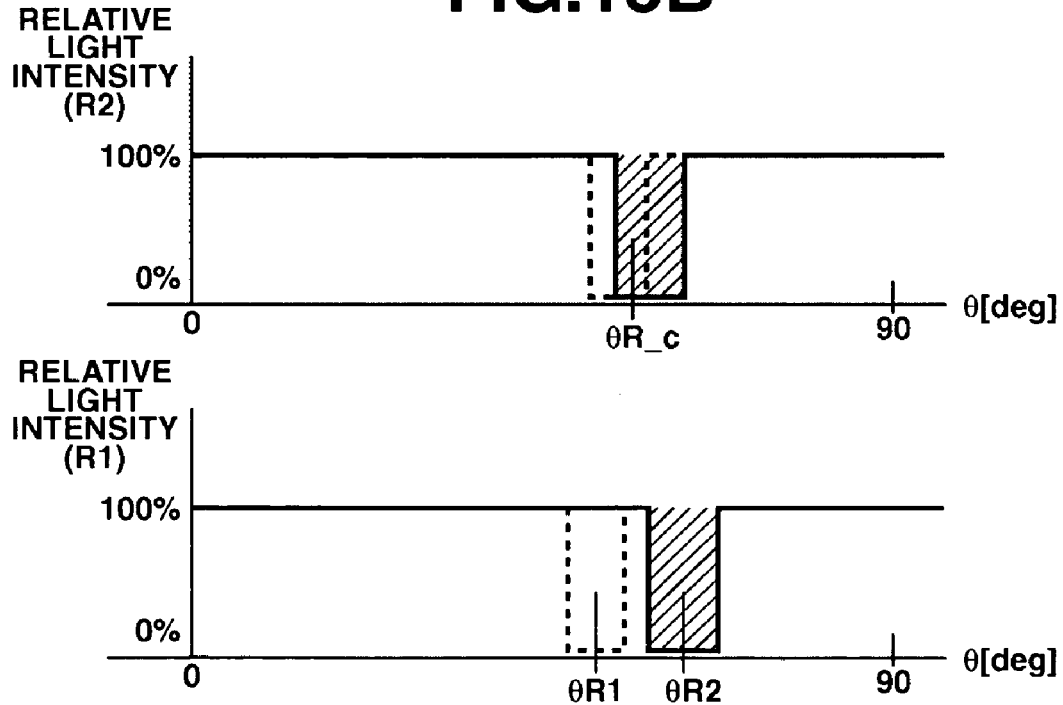

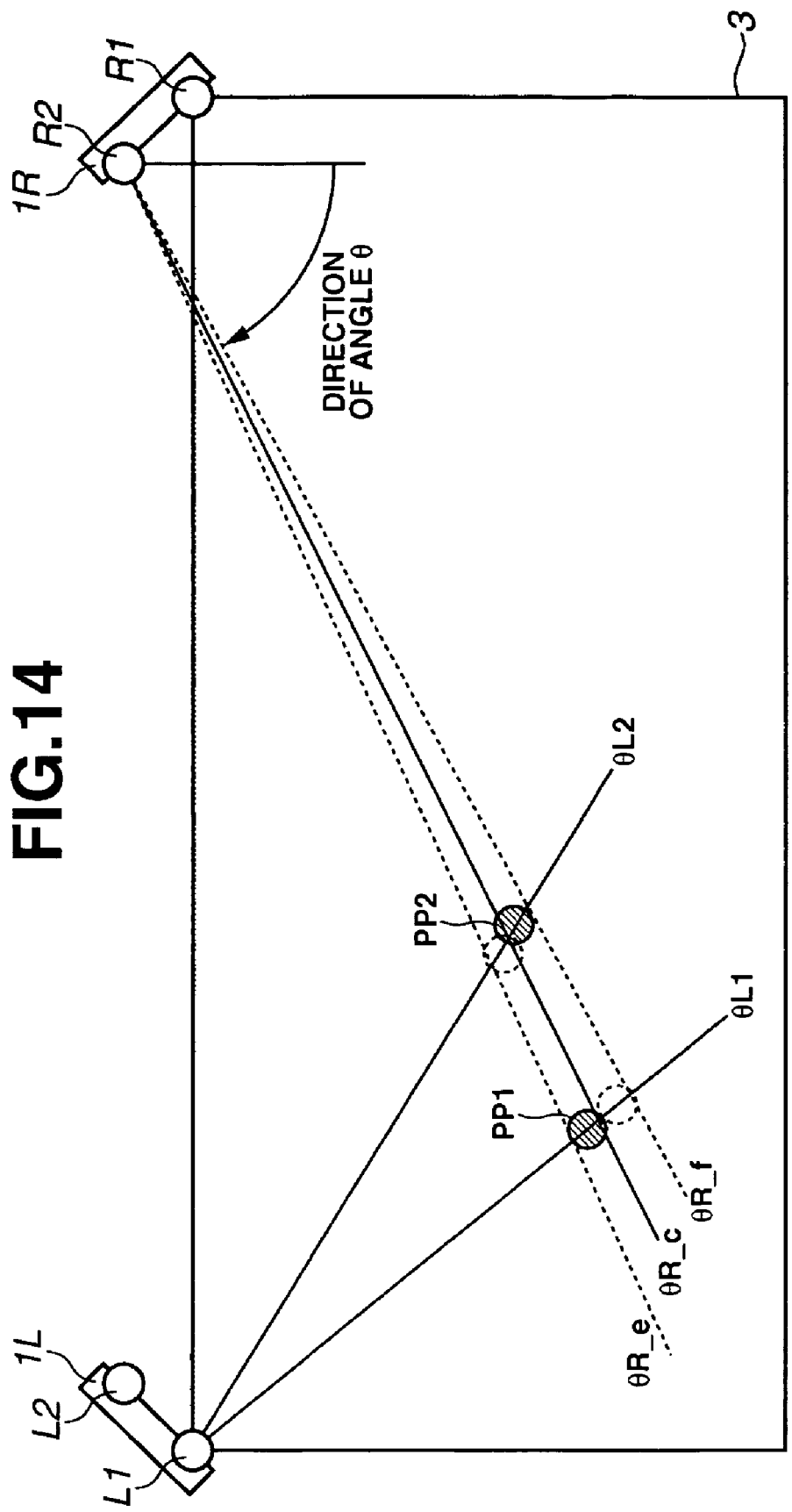

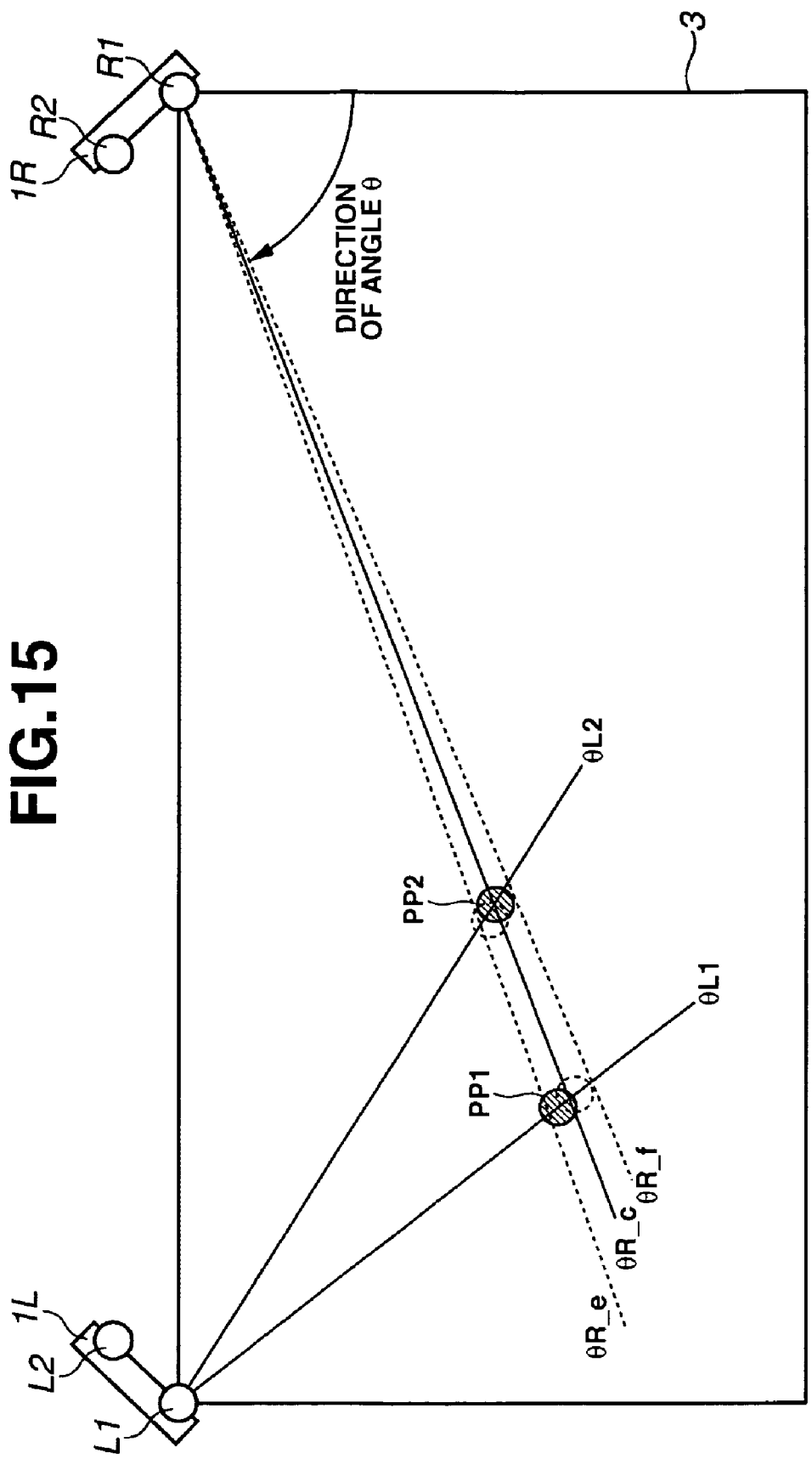

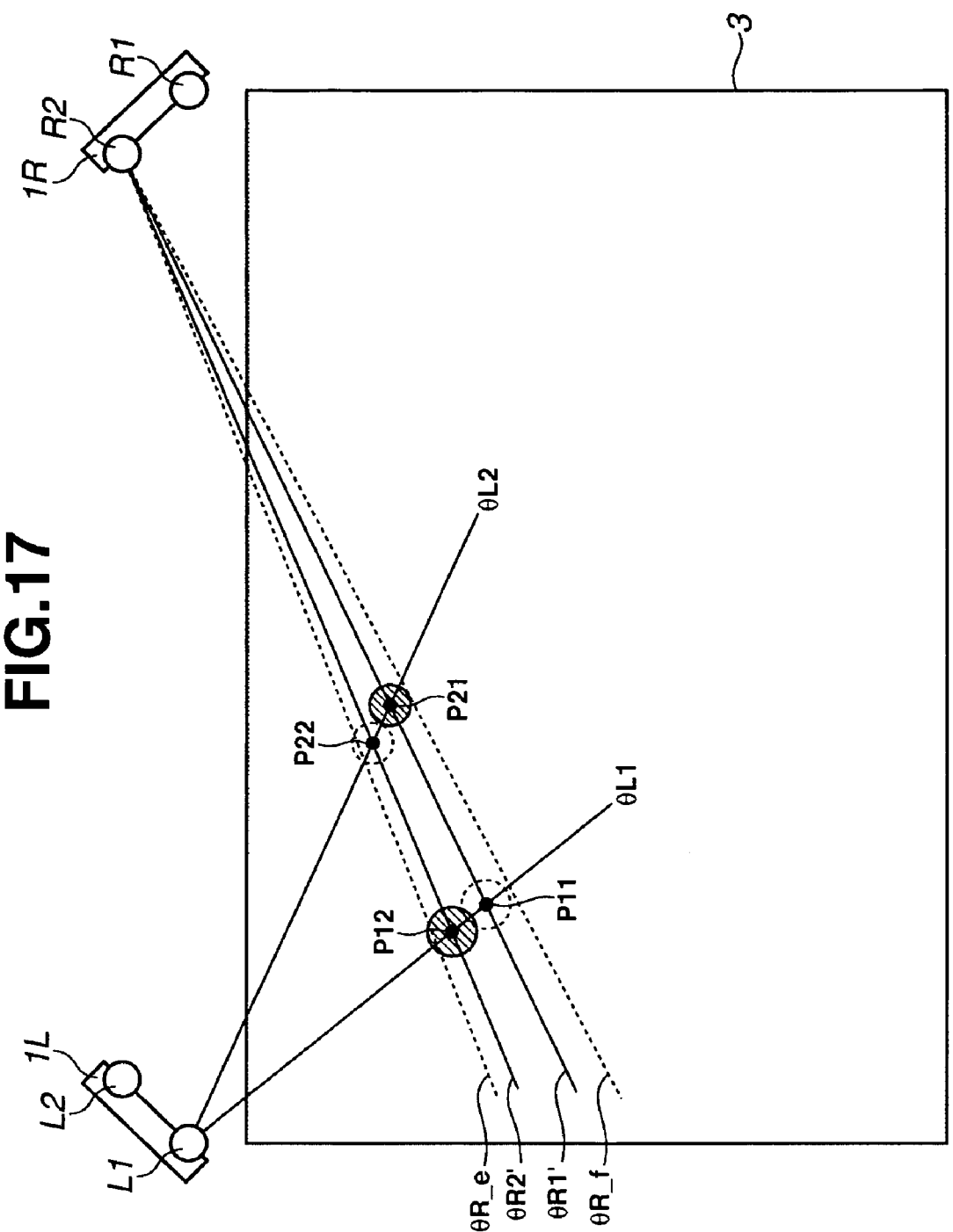

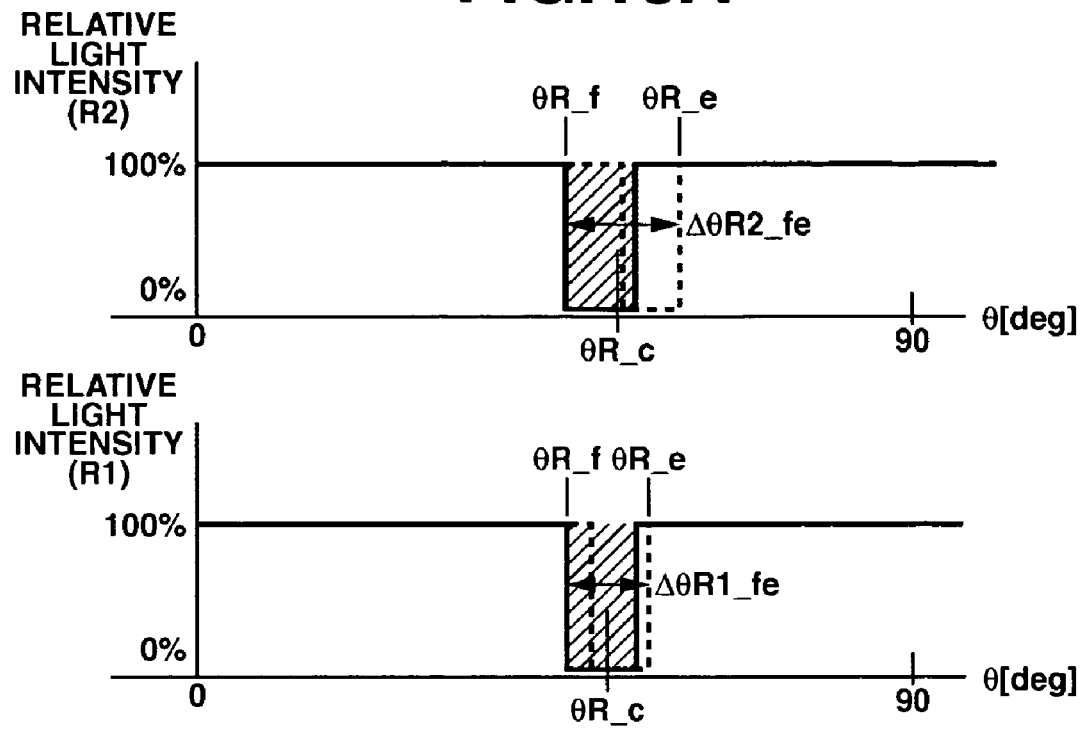
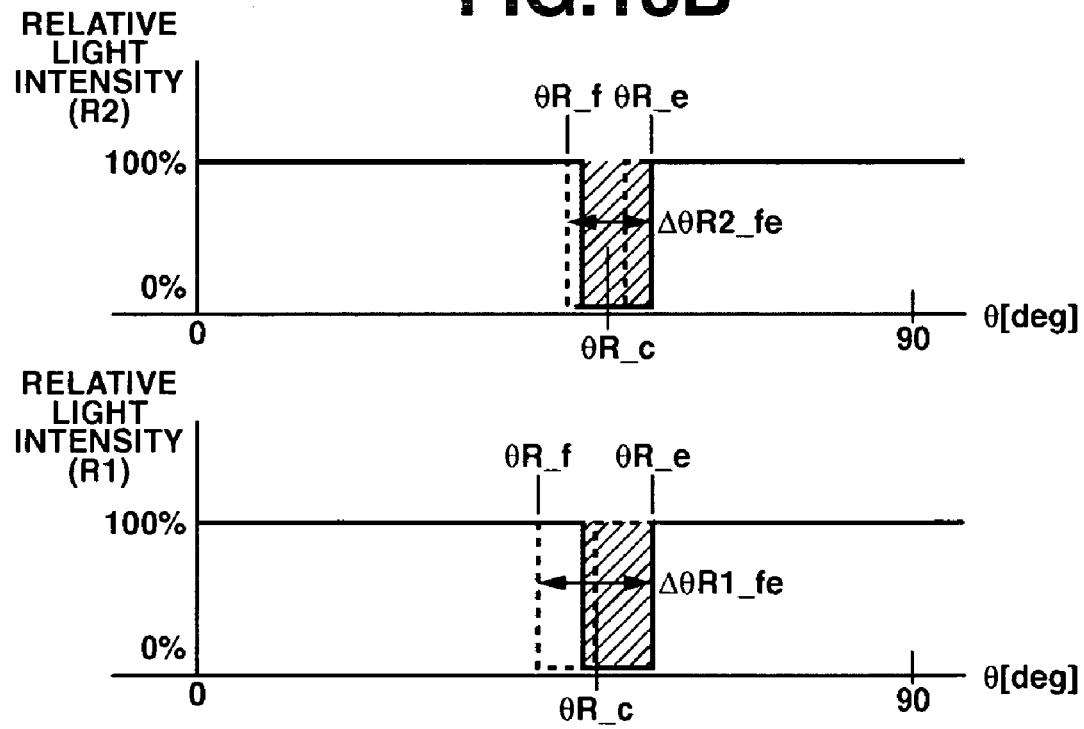

COORDINATE INPUT APPARATUS, CONTROL METHOD THEREFOR, AND PROGRAM

BACKGROUND OF THE INVENTION

1. Field of the Invention

The present invention relates to a coordinate input apparatus configured to detect a pointed position on a coordinate input region, a control method adapted to control the coordinate input apparatus, and a program adapted to perform the control method.

2. Description of the Related Art

There are coordinate input apparatuses used to input coordinates designated by pointers (for example, a dedicated inputting pen, and a finger) to control computers connected thereto and to write characters, graphics, and so on.

Hitherto, various types of touch panels have been proposed or become commercially available as the coordinate input apparatuses of this kind. The touch panels are widely used because operations of terminals, such as a personal computer, can easily be directed on the screen without using special instruments.

There are various coordinate input methods, such as a method using a resistive film and a method using an ultrasonic wave. For example, U.S. Pat. No. 4,507,557 discusses a coordinate input method using light and also discusses the following configuration. That is, a retroreflecting sheet is provided outside a coordinate input region. Illumination units configured to illuminate objects with light, and light-receiving units configured to receive light are disposed at corner ends of the coordinate input region. The angle between a shielding object, such as a finger, which shields light in the coordinate input region, and each of the light receiving units is detected by using the illumination unit and the light receiving unit. According to results of the detection, the pointed position of the shielding object is determined.

Also, Japanese Patent Application Laid-Open Nos. 2000-105671 and 2001-142642 discuss coordinate input apparatuses each of which has a retroreflecting member configured around a coordinate input region, and which detects the coordinates of a part (light-shielded part), at which retroreflected light is shielded.

Among these apparatuses, the apparatus discussed in Japanese Patent Application Laid-Open No. 2000-105671 detects a peak of the intensity of light received by the light-receiving unit, which peak appears at a position corresponding to a light-shielded part and is caused by a shielding object, by performing a computing operation, such as a differentiation, on waveforms. Thus, this apparatus detects the angle of the light-shielded part with respect to the light-receiving unit. Then, this apparatus calculates the coordinates of the shielding object according to a detection result. Also, the apparatus discussed in Japanese Patent Application Laid-Open No. 2001-142642 detects one end and the other end of a light-shielded part by comparison with a specific level pattern, and then detects the center of these coordinates.

Incidentally, the methods of calculating the coordinates of a light shielding position, which are discussed in U.S. Pat. No. 4,507,557 and Japanese Patent Application Laid-Open Nos. 2000-105671 and 2001-142642, are hereunder referred to simply as the light shielding methods.

In the coordinate input apparatus according to such a light shielding method, especially, in a case where the coordinate input region has a large size, there have been demands for facilitating a plurality of operators to contemporaneously input, thereby providing a more efficient conference. Thus, a coordinate input apparatus supporting a plurality of contemporaneous inputs has been contrived.

Japanese Patent Application Laid-Open Nos. 2002-055770 and 2003-303046, and Japanese Patent Registration No. 2896183 discuss techniques of detecting angles of a plurality of light-shielded parts by each single light-receiving sensor, calculating several input coordinate candidates from a combination of the angles detected by each of the sensors, and further detecting actual inputted coordinates from the input coordinate candidates that have resulted from a contemporaneously input of a plurality of coordinates.

For example, in a case where a two point input mode is employed, the coordinates of four points are calculated at a maximum as input coordinate candidates. Among the four points, two points, the coordinates of which are actually inputted, are determined, so that the coordinates of the two points are outputted. That is, this determination is to discriminate actual input coordinates from false input coordinates among a plurality of input coordinate candidates, and to subsequently determine final input coordinates. Hereunder, this determination is referred to as "true or false determination."

Japanese Patent Application Laid-Open No. 2003-303046 and Japanese Patent Registration No. 2896183 discuss the following techniques as practical methods of performing this true or false determination. That is, first and second sensors are provided at both ends of one side of a conventional coordinate input region to be spaced apart by a distance sufficient to precisely calculate coordinates of a pointed position within the coordinate input region. In addition, a third sensor is provided at a position between the first and second sensors to also be spaced apart from the first and second sensors by a distance sufficient to precisely calculate coordinates of a pointed position within the coordinate input region. Also, according to angle information from the third sensor, which information differs from angle information from each of the first and second sensors, the true or false determination is made on a plurality of pieces of angle information, which are detected by the first and second sensors.

Meanwhile, a method of disposing a plurality of sensor units around a coordinate input region at predetermined intervals and causing the plurality of sensor units to observe substantially the same direction and substantially the same region has been discussed to reduce the chance of, even when a plurality of light-shielded shadows overlap, one of the shadows from being detected to be completely hidden in the other shadow. Also, a method of detecting, when a plurality of shadows overlap, a direction, in which each of the shadows is present, by observing one of end portions of each of the shadows has been discussed.

The coordinate input apparatuses according to the aforementioned light shielding methods essentially can detect four coordinate candidate points that include two real images and two virtual images, for example, in a case where two input operations are concurrently performed, regardless of the configurations of the apparatuses.

However, the methods of performing true or false determinations to determine coordinate candidate points as actual input points from four coordinate candidate points have drawbacks.

For instance, the methods discussed in Japanese Patent Application Laid-Open No. 2003-303046 and Japanese Patent Registration No. 2896183 have drawbacks in that the field of view of the third sensor is insufficient to stably perform a true or false determination, that it can be difficult due to constraints on the apparatus to install the third sensor by sufficiently securing the field of view to always perform a true or false determination without an error, and that in a case where a fourth sensor is additionally provided to supplement the field of view that the third sensor does not sufficiently assure, an operation of matching detection values obtained by the sensors is complicated.

Also, in the case of the method of reducing the chance of, even when a plurality of light-shielded shadows overlap, one of the shadows from being detected to be completely hidden in the other shadow, accuracy of the true or false determination is deteriorated when one of the sensors observes the overlap of a plurality of shadows associated with actual input points. Disturbances and various fluctuations can result in erroneous true-or-false determinations. In this case, the apparatus can detect erroneous coordinates of a position that can be difficult unlikely in normal conditions.

SUMMARY OF THE INVENTION

An exemplary embodiment is directed to a coordinate input apparatus capable of detecting a plurality of concurrently inputted coordinates with good accuracy, to a control method adapted to control the coordinate input apparatus, and a program adapted to implement the control method.

In one exemplary embodiment, a coordinate input apparatus, which is configured to detect a position pointed on a coordinate input region, includes first and second sensor units, each associated with one end of an edge of the coordinate input region, where the first and second sensor units each have at least two optical units, wherein the at least two optical units includes a light projecting unit configured to project light onto the coordinate input region and a light receiving unit configured to receive incoming light, a detection unit configured to detect angle information representing directions of shadows, which are areas light-shielded by pointing performed by two pointing means, according to a light amount distribution, which is obtained from the optical units of the first and second sensor units, on the region including the shadows, and a calculation unit configured to calculate coordinates of positions pointed by the two pointing means by using 1) a combination of pieces of angle information on the shadows detected by a combination of the optical units of the different sensor units, and 2) a combination of pieces of angle information on the shadows detected by a combination of the optical units of a same sensor unit.

In another exemplary embodiment, a method of controlling a coordinate input apparatus configured to detect a position pointed on a coordinate input region by using first and second sensor units, each associated with one end of an edge of one side of the coordinate input region, wherein the first and second sensor units each have at least two optical units, wherein the at least two optical units including a light projecting unit configured to project light onto the coordinate input region and a light receiving unit configured to receive incoming light, includes a detection step of detecting angle information representing directions of shadows, which are areas light-shielded by pointing performed by two pointing means, according to a light amount distribution, which is obtained from the optical units of the first and second sensor units, on the region including the shadows, and a calculation step of calculating coordinates of positions pointed by the two pointing means by using 1) a combination of pieces of angle information on the shadows detected by a combination of the optical units of the different sensor units and 2) a combination of pieces of angle information on the shadows detected by a combination of the optical units of a same sensor unit.

In still another exemplary embodiment, program configured to implement control of a coordinate input apparatus configured to detect a position pointed on a coordinate input region by using first and second sensor units. The first and second sensor units are provided in the vicinity of an associated end of both ends of one side of the coordinate input region and has two optical units including a light projecting unit configured to project light onto the coordinate input region. Included is a light receiving unit configured to receive incoming light, further included is a program code configured to perform a detection step of detecting angle information representing directions of shadows, which are areas light-shielded by pointing performed by two pointing means, according to a light amount distribution. The light amount is obtained from the optical units of the first and second sensor units, on the region including the shadows, using a program code configured to perform a calculation step of calculating coordinates of positions pointed by the two pointing means by using 1) a combination of pieces of angle information on the shadows detected by a combination of the optical units of the different sensor units and 2) a combination of pieces of angle information on the shadows detected by a combination of the optical units of a same sensor unit.

At least one exemplary embodiment is directed to a coordinate input apparatus capable of detecting a plurality of concurrently inputted coordinates with good accuracy, and also provides a control method adapted to control the coordinate input apparatus, and a program adapted to implement the control method.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention.

FIGS. 8A and 8B are graphs illustrating light intensity distributions obtained from sensor units by performing input operations illustrated in FIG. 7;

FIGS. 13A and 13B are graphs illustrating light intensity distributions obtained from sensor units by performing input operations illustrated in FIGS. 11 and 12;

FIG. 14 is an explanatory view illustrating a coordinate calculation method according to the first exemplary embodiment;

FIG. 15 is an explanatory view illustrating a coordinate calculation method according to the first exemplary embodiment;

FIG. 17 is an explanatory view illustrating a coordinate calculation method according to the first exemplary embodiment;

FIGS. 18A and 18B are graphs illustrating light intensity distributions obtained from sensor units by performing input operations illustrated in FIGS. 14 and 15;

DETAILED DESCRIPTION OF THE EMBODIMENTS

Figure 1:
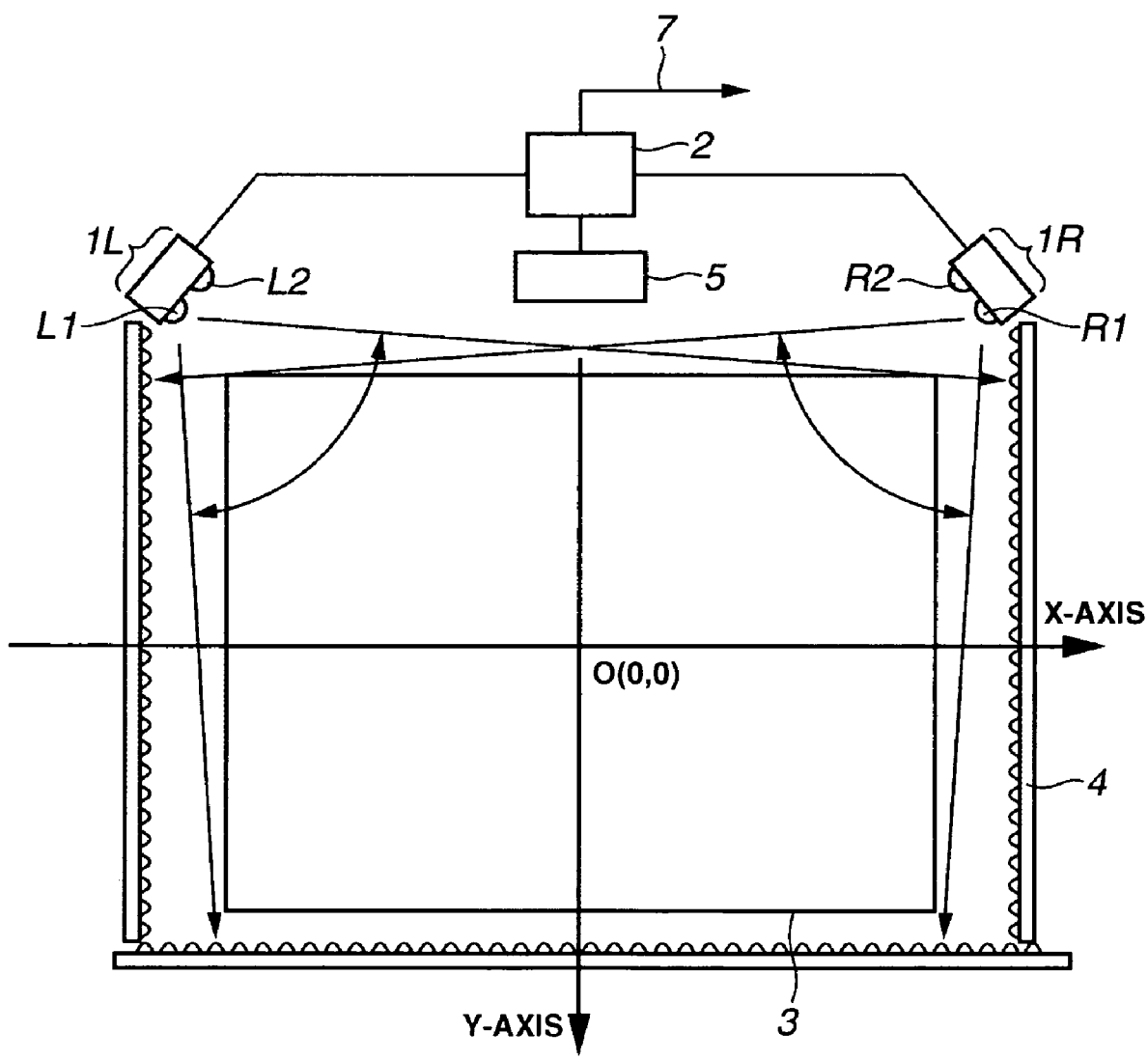
FIG. 1 is a view illustrating the external appearance of a coordinate input apparatus according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of charged coupling devices (CCD) and lenses.

In all of the examples illustrated and discussed herein any specific values, for example an angular range of view are not limited by the values in the examples. Thus, other examples of the exemplary embodiments could have different values.

Notice that similar reference numerals and letters refer to similar items in the following figures, and thus once an item is defined in one figure, it may not be discussed for following figures.

Exemplary embodiments of the invention will be described in detail below with reference to the drawings.

First Exemplary Embodiment

FIG. 1 is a view illustrating the external appearance of a coordinate input apparatus according to a first exemplary embodiment of the present invention.

In FIG. 1, reference numerals 1L and 1R designate sensor units, each of which has a light projecting unit and a light receiving unit. In the first exemplary embodiment, the sensor units 1L and 1R are disposed along a line generally parallel to an X-axis of a coordinate input effective region 3 serving as a coordinate input surface, as illustrated in this figure. The sensor units 1L and 1R are also disposed at the positions symmetrical with respect to a Y-axis, and are spaced apart by a predetermined distance. The sensor units 1L and 1R are connected to a control/arithmetic unit 2, and are adapted to receive control signals from the control/arithmetic unit 2, and to transmit detection signals to the control/arithmetic unit 2.

Reference numeral 4 designates a retroreflecting member, which can have a retroreflecting surface that reflects incoming light to an arrival direction. The retroreflecting member 4 is provided on each of three outer sides of the coordinate input effective region 3, as illustrated in FIG. 1. Each of the retroreflecting members 4 retroreflects light rays projected from the left sensor unit 1L and the right sensor unit 1R within a range of an angle of substantially 90° toward the sensor units 1L and 1R, respectively.

Incidentally, each of the retroreflecting members 4 microscopically has a three-dimensional structure. For example, a retroreflecting tape of the bead type, or a retroreflecting tape adapted to cause retroreflection by regularly arranging corner cubes by machining can be the retroreflecting member 4.

Light retroreflected by the retroreflecting members 4 is one-dimensionally detected by the sensor units 1L and 1R, and data representing the light amount distribution of the reflected light is transmitted to the control/arithmetic unit 2.

The coordinate input effective region 3 can be utilized as an interactive input device when formed as the screen of a display device, such as a PDP, a rear projector, or an LCD panel.

With such a configuration, when input-pointing is performed on the coordinate input effective region 3 by a pointing unit (a pointing means), such as a finger, or a pointer, light projected from the light-projecting units is shielded, so that a light-shielded part is formed. Because the light-receiving units of the sensor units 1L and 1R cannot detect light coming from that light-shielded part, that is, light reflected by the retroreflection. Consequently, a direction, the light coming from which cannot be detected, can be determined. The pointing means in the exemplary embodiments can be any type of device for pointing a coordinate input and/or can be a finger (a person's finger).

Thus, the control/arithmetic unit 2 detects a plurality of light-shielded ranges of a part, on which the input positioning performed by the pointer according to changes in light amount detected by the left sensor unit 1L and the right sensor unit 1R. Then, the control/arithmetic unit 2 calculates directions (or angles) of the end portions of the light-shielded ranges corresponding to the sensor units 1L and 1R according to pieces of end portion information, which pieces correspond to the light-shielded ranges. In a case where the pointer has a signal transmitting unit, a pen signal receiving unit 5 receives a pen signal outputted from the pointer.

Then, the control/arithmetic unit 2 determines data obtained from the light-shielded ranges, which are used in the coordinate calculations, according to the numbers of the detected light-shielded ranges. Also, the control/arithmetic unit 2 geometrically calculates a coordinate value indicating the light-shielded position of the pointer on the coordinate input effective region 3 according to the calculated directions (or angles), and information on the distance between the sensor units 1L and 1R. The control/arithmetic unit 2 outputs coordinate values to an external apparatus, such as a host computer, connected to the display device through an interface 7 (for example, a USB interface, or an IEEE1394 interface).

Thus, operations of the external terminal, for example, operations of drawing a line on the screen, and of operating an icon displayed on the screen of the display device are enabled by the pointer.

Detailed Description of Sensor Units 1L and 1R

Next, the configuration of each of the sensor units 1L and 1R is described below by referring to FIG. 2. Incidentally, as described above, each of the sensor units 1L and 1R roughly includes a light-projecting unit and a light-receiving unit.

Figure 2:
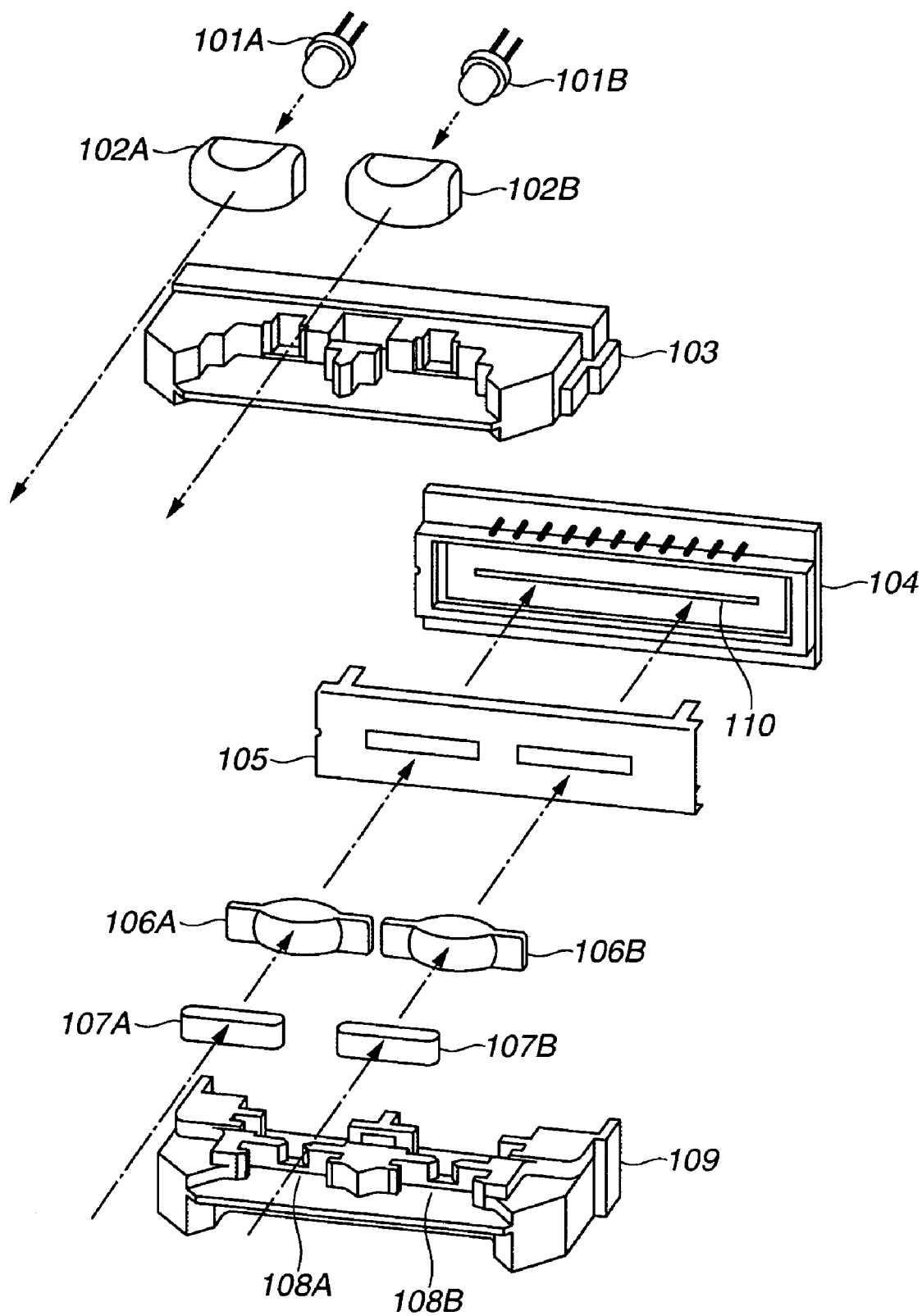
FIG. 2 is a view illustrating a configuration of a sensor unit according to the first exemplary embodiment in detail.

FIG. 2 is a view illustrating the detailed configuration of the sensor unit according to the first exemplary embodiment of the present invention.

Referring to FIG. 2, reference numerals 101A and 101B designate infrared LEDs adapted to emit infrared light. The infrared LEDs 101A and 101B project light to the retroreflecting members 4 by using light-projecting lenses 102A and 102B within a range of an angle of substantially 90 degrees. The light-projecting unit in each of the sensor units 1L and 1R is implemented by the infrared LEDs 101A and 101B and the light-projecting lenses 102A and 102B. Thus, each of the sensor units 1L and 1R includes two light-projecting units.

Then, infrared light rays projected by the light-projecting units are retroreflected by the retroreflecting members 4 in the arrival directions. The light-receiving units in the sensor units 1L and 1R detect the retroreflected light rays.

Each of the light-receiving units has a one-dimensional line CCD 104 provided with a shield member 105 adapted to limit the field of view of light rays and to serve as an electrical shield. Also, each of the light-receiving units has light-receiving lenses 106A and 106B (for instance, fθ-lenses) serving as a condenser optical system, diaphragms 108A and 108B adapted to substantially limit an incident direction of incident light, and infrared filters 107A and 107B adapted to reduce unnecessary light (disturbance light), such as visible light, from being incident thereupon.

Then, the light rays reflected by the retroreflecting members 4 are focused on a surface of a detection element 110 of the line CCD 104 through the infrared filters 107A and 107B and the diaphragms 108A and 108B by the light-receiving lenses 106A and 106B. Thus, each of the sensor units 1L and 1R can include two light-receiving units.

Members 103 and 109 are adapted to respectively serve as an upper hood 103 and lower hood 109, on which optical components forming the light-projecting units and light-receiving units are provided, and are also adapted to reduce light projected by the light-projecting units from directly being incident upon the light-receiving units, or cutting off external light.

Although the diaphragms 108A and 108B are integrally molded on the lower hood 109 in the first exemplary embodiment, the diaphragms 108A and 108B can be formed as separate components. Also, positioning units adapted to align the diaphragms 108A and 108B and the light-receiving lenses 106A and 106B can be provided at the side on the upper hood 103, so that a configuration adapted to facilitate the alignment of the light-receiving units with the light-projecting centers of the light-projecting units (that is, a configuration in which all principal optical components are disposed only on the upper hood 103) can also be implemented.

Figure 3A:
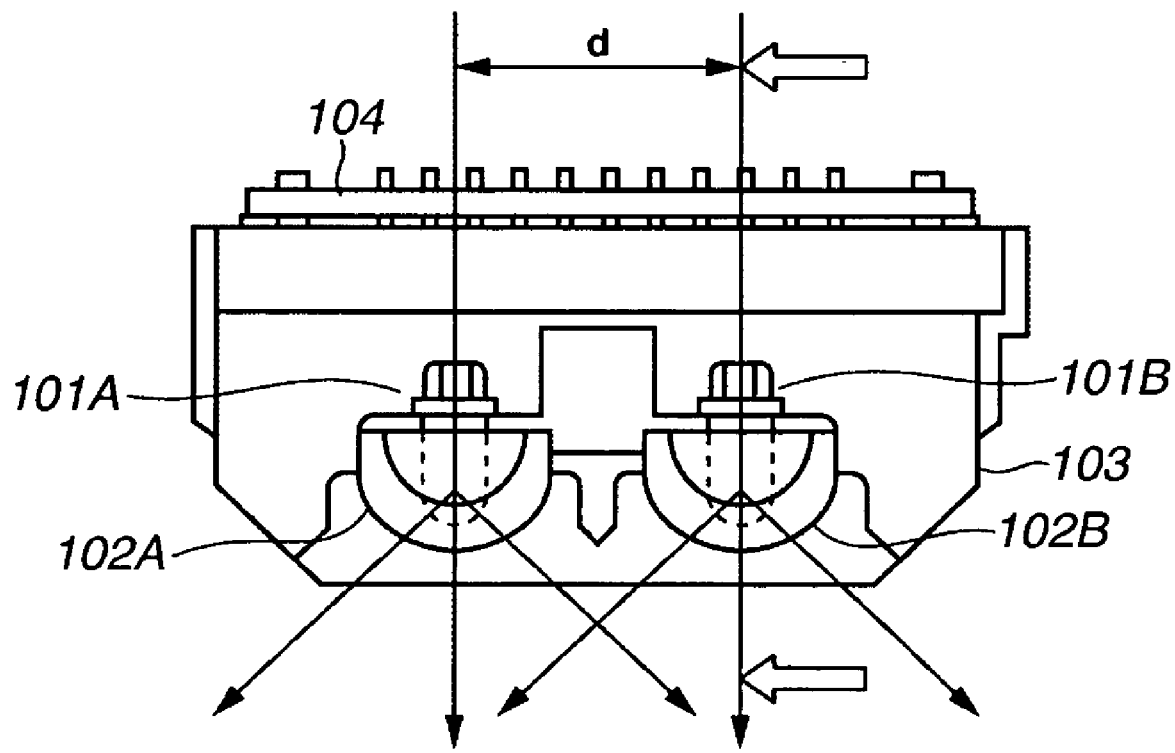
FIG. 3A is a view illustrating an optical configuration of a sensor unit according to the first exemplary embodiment.

FIG. 3A is a view illustrating an assembled state of the sensor unit 1L or 1R shown in FIG. 2, which is viewed from the front direction (that is, a direction perpendicular to the coordinate input surface). As illustrated in FIG. 3A, the two light-projecting units in the sensor unit 1L or 1R are disposed to be spaced apart from each other by a predetermined distance d so that directions of principal rays are substantially parallel to each other, and are also disposed to project light within the range of an angle of substantially 90 degrees by using the light-projecting lenses 102A and 102B.

Figure 3B:
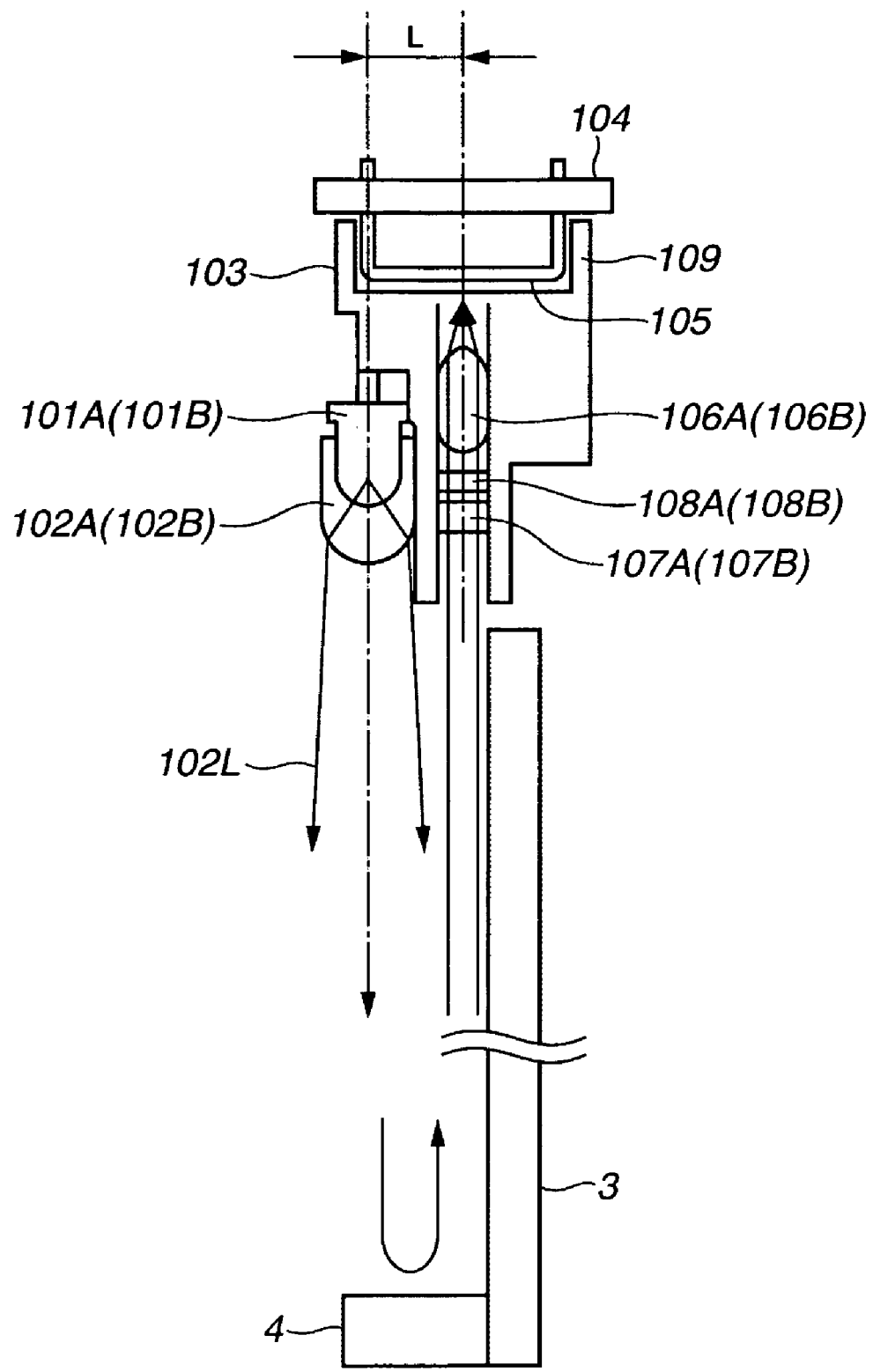
FIG. 3B is a view illustrating an optical configuration of a sensor unit according to the first exemplary embodiment.

FIG. 3B is a cross-sectional view illustrating the sensor unit 1L or 1R of a portion indicated by thick arrows in FIG. 3A. Light, 102L, emitted by the infrared LED 101A or 101B is projected by using the light-projecting lens 102A or 102B to the retroreflecting members 4 as a light beam, whose direction can be limited in some cases to which is substantially parallel to the coordinate input surface.

Figure 3C:
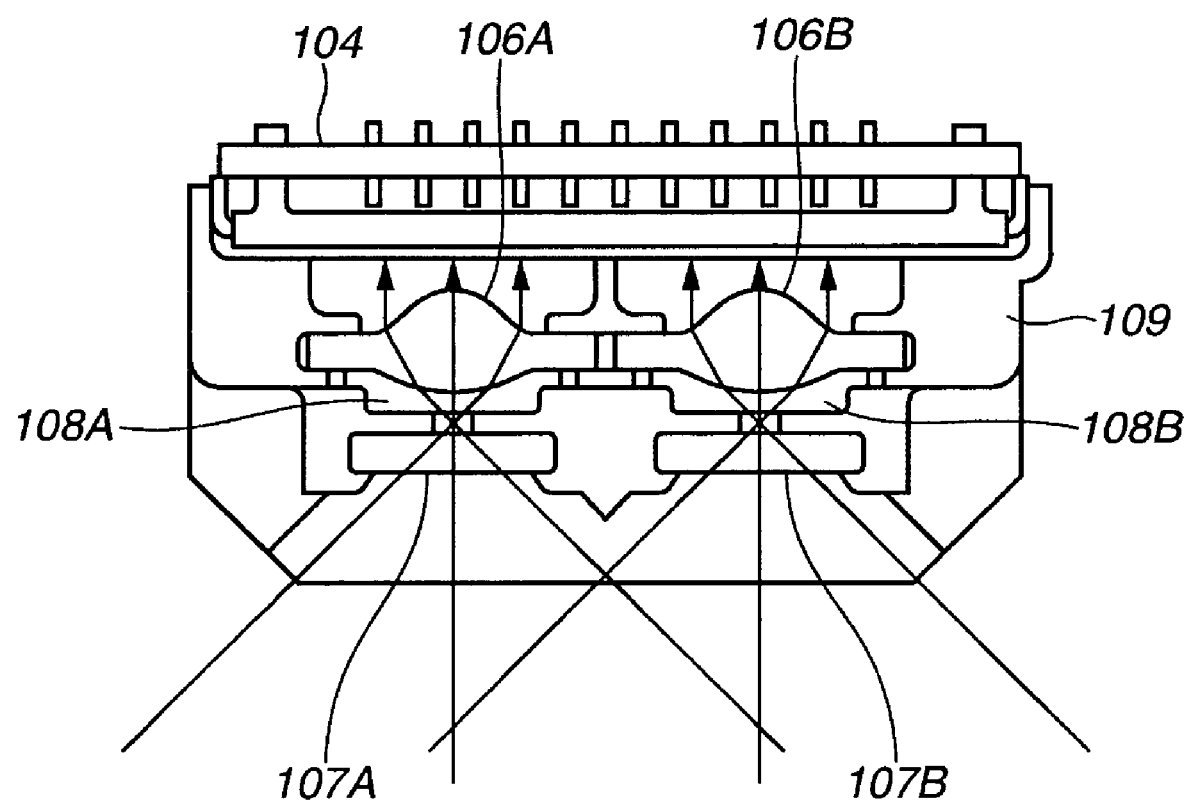
FIG. 3C is a view illustrating an optical configuration of a sensor unit according to the first exemplary embodiment.

Meanwhile, FIG. 3C is a view illustrating the state in which the infrared LEDs 101A and 101B, the light-projecting lenses 102A and 102B, and the upper hood 103 in FIG. 3A are removed when viewed from the front direction (that is, a direction perpendicular to the coordinate input surface).

In the first exemplary embodiment, the light-projecting units and light-receiving units are disposed (see FIG. 3B) to be stacked in the direction perpendicular to the coordinate input effective region 3 serving as the coordinate input surface. The light-projecting units and light-receiving units are configured so that the emission center of each light-projecting unit coincides with a reference position (corresponding to a reference point position used to measure an angle, and the position of the diaphragm 108A or 108B in the first exemplary embodiment, that is, the intersection of light rays in FIG. 3C) of each light-receiving unit, when viewed from the front direction (a direction perpendicular to the coordinate input surface).

Thus, as described above, the two light-projecting units are provided to be spaced apart from each other by the predetermined distance d so that the directions of principal rays are substantially parallel to each other. Consequently, the two light-receiving units are also provided to be spaced apart from each other by the predetermined distance, in this non limiting example d the same amount, so that the optical axes (that is, the optical symmetric axes) are substantially parallel to each other.

A light ray, which is projected by each light-projecting unit and is substantially parallel to the coordinate input surface, that is, light ray projected in the range of an angle of substantially 90 degrees in an in-plane direction, is retroreflected by the retroreflecting members 4 in the arrival direction of light. This light is focused and imaged on the surface of the detection element 110 of the line CCD 104 through the infrared filter 107A or 107B, the diaphragm 108A or 108B, and the light-receiving lens 106A or 106B.

Thus, an output signal of the line CCD 104 represents a light amount distribution corresponding to an angle of incidence of reflected light. Therefore, the pixel number of each of the pixels of the line CCD 104 is represented by angle information.

The distance L between the light-projecting unit and the light-receiving unit shown in FIG. 3B is assumed to have a value sufficiently smaller than the distance from the light-projecting unit to the retroreflecting member 4. Thus, even when the distance L is provided therebetween, sufficient retroreflected light can be detected by each of the light-receiving units.

As described above, the sensor unit 1L or 1R adopts an arrangement having at least two light-projecting units and two light-receiving units for respectively detecting light projected by these light-projecting units (in the first exemplary embodiment, two pairs of light-projecting units and light-receiving units) In the first exemplary embodiment, the left-side portion of the detection element 110 linearly arranged on the line CCD 104, which is a part of the light-receiving units, is used as a focusing region of the first light-receiving unit. The right-side portion of the detection element 110 is used as a focusing region of the second light-receiving unit. With this configuration, the components are commonized. However, the present invention is not limited to such a configuration. Line CCDs can be individually provided to the light-receiving units.

Description of Control/Arithmetic Unit

The control/arithmetic unit 2 and each of the sensor units 1L and 1R exchange mainly CCD control signals for the line CCD 104 in the light-receiving units, CCD clock signals and output signals, and drive signals for the infrared LEDs 101A and 101B in the light-projecting units.

The configuration of the control/arithmetic unit 2 is described below by referring to FIG. 4.

Figure 4:
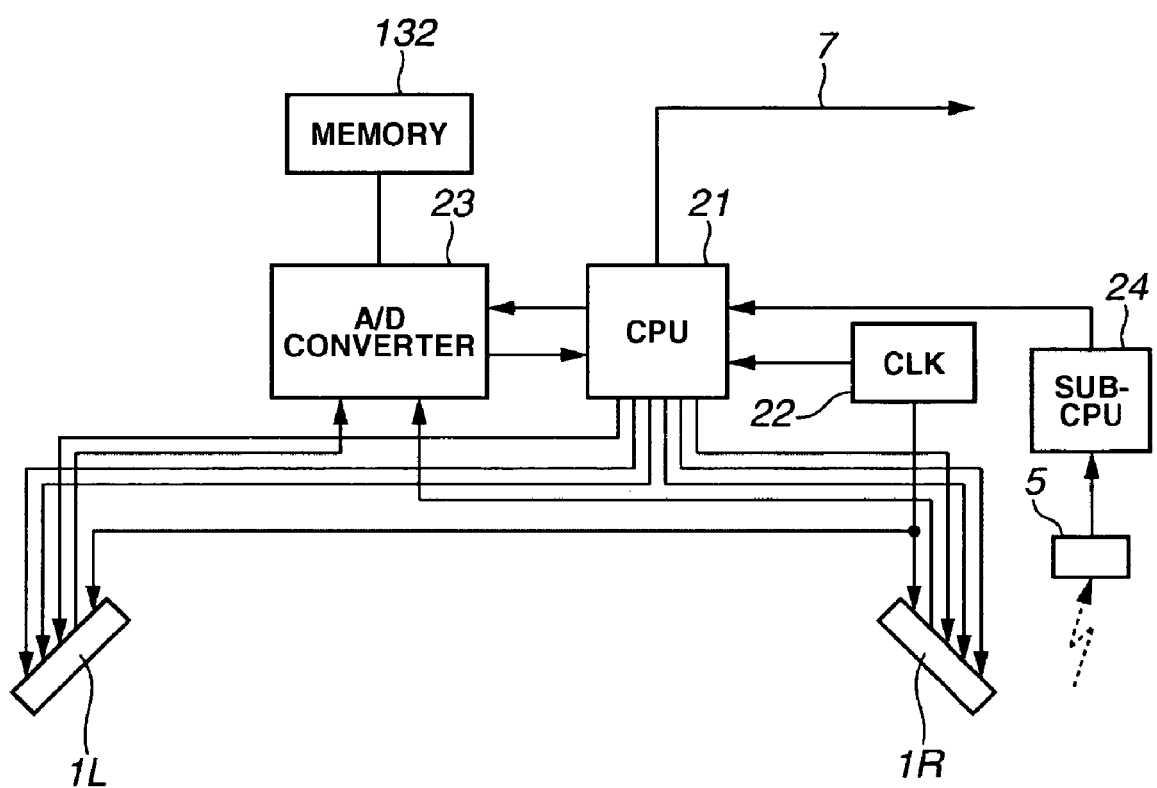
FIG. 4 is a view illustrating a configuration of a control/arithmetic unit according to the first exemplary embodiment in detail.

FIG. 4 is a block view illustrating the configuration of the control/arithmetic unit 2 according to the first exemplary embodiment of the present invention in detail.

The CCD control signals are outputted from an arithmetic control circuit (CPU) 21 including a one-chip microcomputer thereby to set the shutter timing of the line CCD 104, and to control an operation of outputting data.

The arithmetic control circuit (e.g., CPU) 21 operates in response to clock signals from a clock generation circuit (CLK) 22. The CCD clock signals are transmitted from the clock generation circuit (CLK) 22 to the sensor units 1L and 1R, and are also inputted to the arithmetic control circuit 21 to achieve various control operations in synchronization with the line CCDs 104 in the sensor units. The LED drive signals used to drive the infrared LEDs 101A and 101B in the light-projecting units are supplied from the arithmetic control circuit 21 to the infrared LEDs 101A and 101B in the light-projecting units of the associated sensor units 1L and 1R through an LED drive circuit (not shown).

Detection signals outputted from the line CCDs 104 in the light-receiving units of the sensor units 1L and 1R are inputted to an A/D converter 23 and are converted into digital values under the control of the arithmetic control circuit 21. The converted digital values are stored in a memory 132, and are used to calculate angles of the pointers. Coordinate values are calculated from the calculated angles, and are outputted to an external terminal through the serial interface 7 (for example, a USB interface, an IEEE1394 interface, or an RS232C interface and any other interface as known by one of ordinary skill in the relevant art).

In a case where a pen is used as the pointer, a pen signal receiver 5 adapted to receive a pen signal from the pen outputs a digital signal generated by demodulating the pen signal. Then, the digital signal is inputted to a sub-CPU 24 serving as a pen signal detection circuit that analyzes the pen signal, and outputs a result of analysis to the arithmetic control circuit 21.

Detailed Description of Optical Configuration of Sensor Units 1L and 1R

Figure 5:
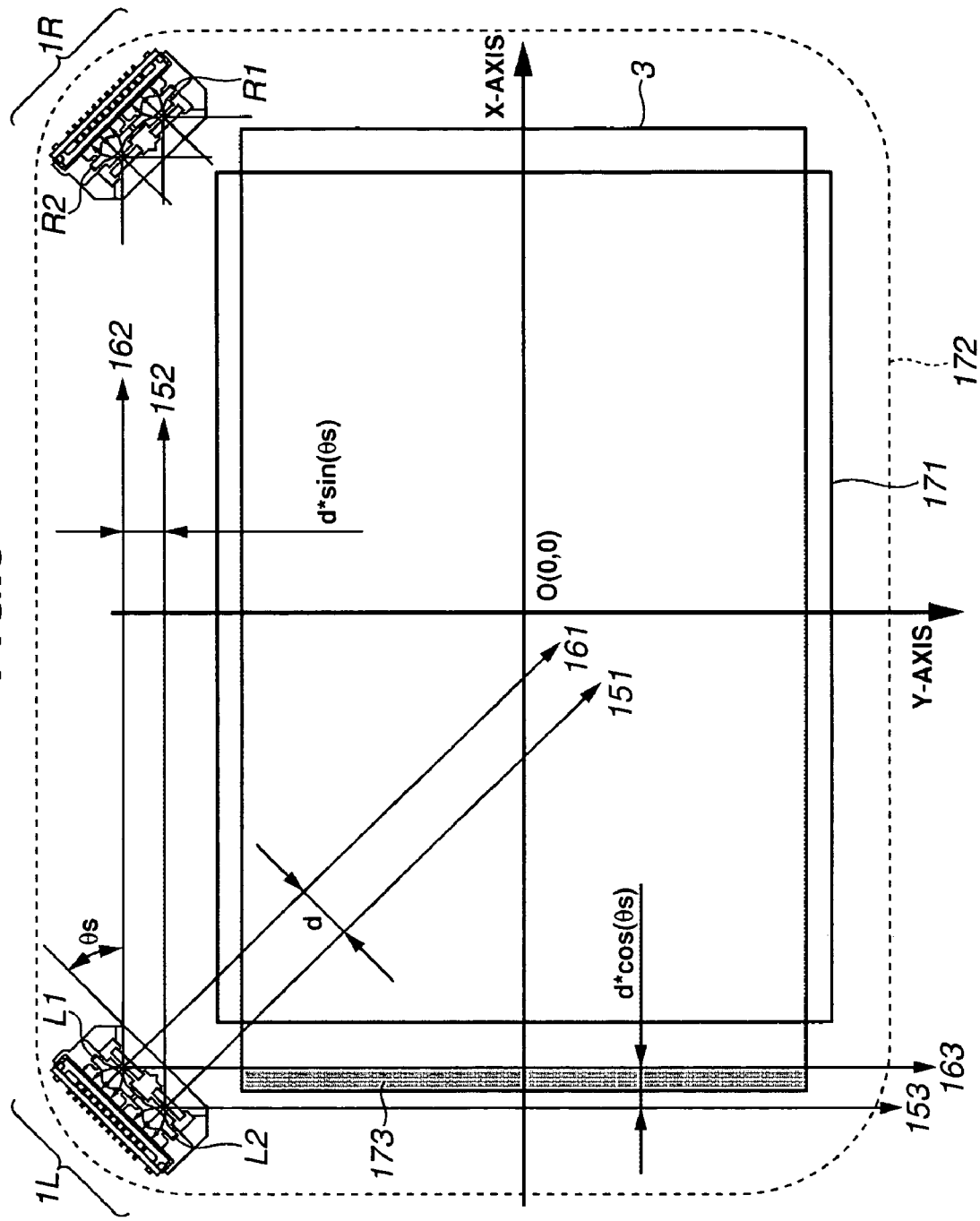
FIG. 5 is an explanatory view illustrating an optical configuration of the coordinate input apparatus according to the first exemplary embodiment.

FIG. 5 is an explanatory view illustrating the optical configuration of the coordinate input apparatus according to the first exemplary embodiment of the present invention.

FIG. 5 illustrates, the configuration of the left sensor unit 1L. The right sensor unit 1R has substantially the same features as those of the left sensor unit 1L, except that it is symmetric to the left sensor unit 1L with respect to the Y-axis in FIG. 5, and the description thereof is omitted.

As described above, the sensor unit 1L has a pair of light-projecting units and a pair of light-receiving units. The optical axes thereof (that is, the optically symmetric axes respectively corresponding to light rays 151 and 161) are disposed to substantially be parallel to each other, and to be spaced apart from each other by the predetermined distance d. The sensor unit 1L is disposed so that a sensor surface thereof is inclined to one side of the coordinate input effective region 3 by an angle $\theta_s$.

The light-projecting range of one light-projecting unit (or the detection angle range of one light-receiving unit) in the sensor unit 1L is defined by light rays 152 and 153, and that of the other light-projecting unit is defined by light rays 162 and 163.

The sensor unit 1R has two pairs of optical units that correspond to a pair of light-projecting units and a pair of light-receiving units (that is, optical units R1 and R2).

The effective visual field range of two optical units (that is, the light-projecting unit and the light-receiving unit) defined by the light rays 152 and 153 or the light rays 162 and 163 is substantially 90 degrees for the non-limiting example. The effective visual field range can vary for example it can be set to be 100 degrees. However, in a case where the effective visual field range is set and designed to be wider, the optical distortion of optical components (for instance, lenses) forming the optical units becomes larger and can make it less useful for forming an inexpensive optical system.

Thus, for obtaining pointed position information of the pointer shielding the projected light, at the respective light-receiving units, to set the coordinate input effective region within a region defined by the light rays 152 and 163. Consequently, in a case where a region 171 is set to be the coordinate input effective region, as illustrated in FIG. 5, the two light-receiving units in the sensor unit 1L can detect the light-shielded position of the pointer (a light-shielding object) in the region 171.

However, this setting can cause a problem in that, for example, a housing frame determined by the relation between a housing 172 of the coordinate input apparatus, which incorporates the components, and the coordinate input region 171 becomes large. Thus, the size of the coordinate input apparatus becomes large, as compared with an operable region. To facilitate the reduction coordinate input apparatus, at least one exemplary embodiment reduces not only the size of the sensor unit 1L or 1R but the predetermined distance d between the two pairs of optical units (that is, the light-projecting units and the light-receiving units), which is defined by the light rays 151 and 161.

In the coordinate input apparatus according to the first exemplary embodiment, to reduce the size of the housing frame determined by the coordinate input effective region 3 and the housing 172 as much as possible, the effective field of view of one light-receiving unit in the sensor unit 1L (1R) can include the entire coordinate input effective region 3. Also, a region defined by a region 173 shown in FIG. 5 of the other light-receiving unit is set to be outside the effective visual field.

Meanwhile, the distance d is set so that a projected component of the distance d, as viewed from the direction of the pointer, that is, the value of $d*\cos(\theta_L-\theta_S)$ is substantially equal to a radius of the pointer when the pointer is placed at the left or right end portion or the top portion of the coordinate input effective region 3. $\theta_L$ is an angle measured from a left vertical line passing through L1 to the point of interest (see FIG. 19).

Thus, the apparatus is configured so that the pointer existing in the region 173 shown in FIG. 5 is prevented from being completely included in an area defined between the light rays 151 and 161 shown in FIG. 5.

The first exemplary embodiment can acquire data representing light intensity distributions obtained from the optical units L1, L2, R2, and R1 shown in FIG. 5. Then, the first exemplary embodiment calculates the number of shadows and the positions (or angles) of the shadows, which are obtained by the optical units, according to the light intensity distributions. Also, the first exemplary embodiment sequentially selects four combinations (L1, R1), (L1, R2), (L2, R1), and (L2, R2) of the optical unit L1 or L2 of the sensor unit 1L and the optical unit R1 or R2 of the sensor unit 1R.

Subsequently, the first exemplary embodiment determines coordinate candidate points respectively corresponding to the combinations of the optical units and also determines the situation of overlaps among the coordinate candidate points. Then, the first exemplary embodiment selects an appropriate combination of the optical units thereamong. Consequently, the first exemplary embodiment determines actual input points from the coordinate candidate points (that is, performs what is called a true or false determination). Finally, the first exemplary embodiment determines two input coordinates.

Hereinafter, the four combinations (L1, R1), (L1, R2), (L2, R1), and (L2, R2) of the optical units are referred to as the "LR-optical unit combinations" or the "LR-combinations."

Figure 6:
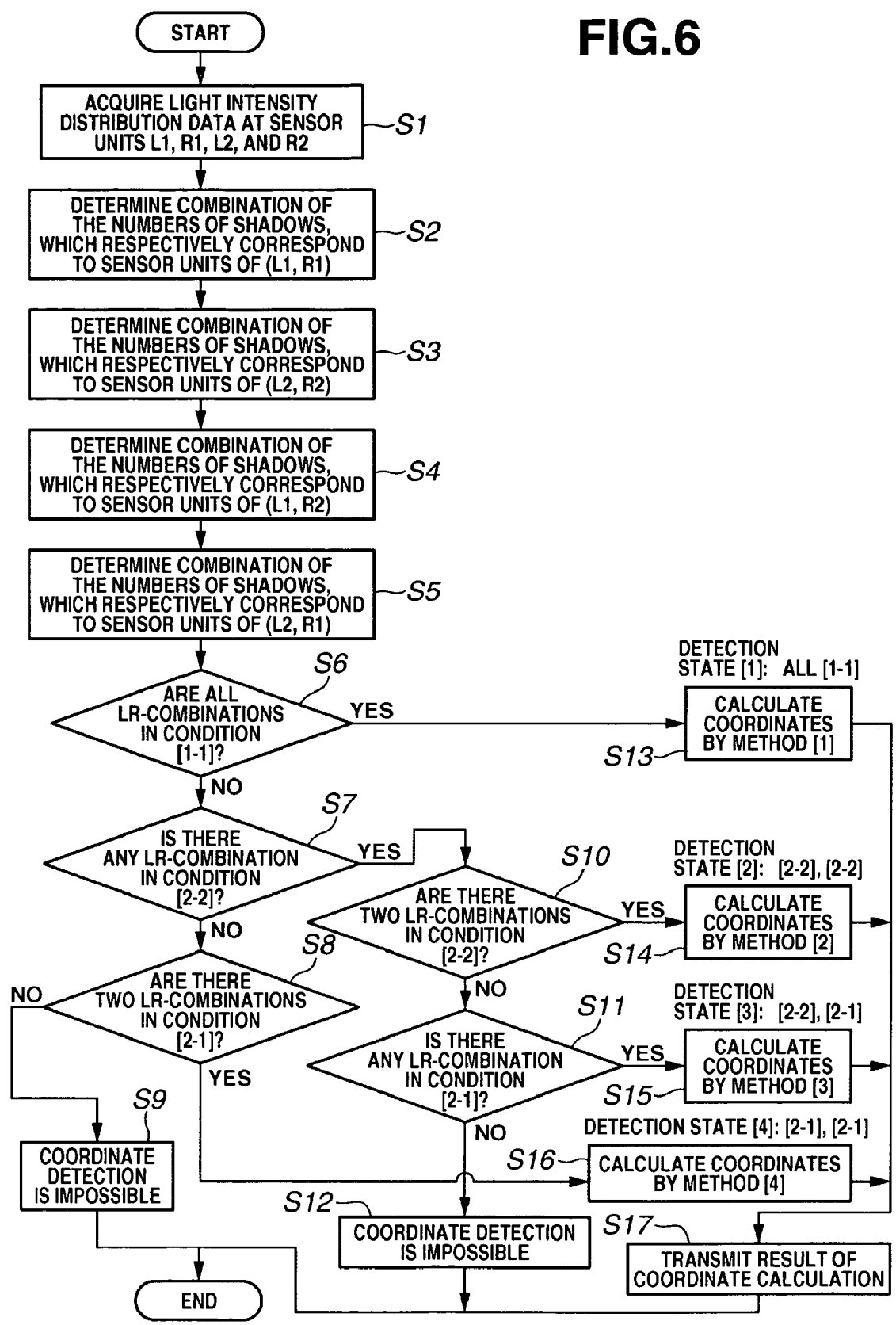
FIG. 6 is a flowchart illustrating a coordinate calculation process performed by the coordinate input apparatus according to the first exemplary embodiment.

Next, a coordinate calculation process according to the first exemplary embodiment is described by referring to FIG. 6.

FIG. 6 is a flowchart illustrating the coordinate calculation process performed by the coordinate input apparatus according to the first exemplary embodiment.

First, in step S1, data representing the light intensity distributions in the optical units L1, L2, R1, and R2 is acquired. Subsequently, in steps S2 to S5, data representing light intensity distributions corresponding to the LR-combinations is sequentially selected from the acquired data representing the light intensity distributions. Then, a coordinate candidate point determination process is performed on the selected data representing the light intensity distributions. Thus, the combinations of the numbers of shadows, which correspond to the LR-combinations, can be determined in steps S2 to S5.

Next, a coordinate calculation process is performed according to a result of the coordinate candidate point determination process in steps S6 to S17.

Then, the following conditions are obtained according to the combinations of shadows, which correspond to the LR-combinations.

Condition A (1-1) in which both of the optical units detect only one shadow.

Condition B (2-1) in which one of the optical units of one of the sensor units detects two shadows, and in which one of the optical units of the other sensor unit detects only one overlapping shadow.

Condition C (2-2) in which both of one of the optical units of one of the sensor units and one of the optical units of the other sensor unit detect two shadows.

Condition D (0-0) in which each of the optical units detects no shadows.

In the expression [*a–*b] described in the following description, "*a" represents the number of shadows detected by the optical unit that detects shadows of the number larger than the number of shadows detected by the other optical unit of the LR-combination. Further, "*b" represents the number of shadows detected by the latter optical unit of the LR-combination. Therefore, the order relation between "*a" and "*b" is independent of the LR-combination of the optical units.

It is assumed in the first exemplary embodiment that in a case where certain input pointing is performed by the pointer in the first exemplary embodiment, and where a shadow associated with the input pointing is detected by one of the optical units, unless the detected shadow and another shadow overlap, the shadow associated with the input pointing can be detected by a substantial portion of the optical units other than the one of the optical units.

The following description of exemplary embodiments is made with the exception of a case where certain input pointing is performed, where one of the optical units detects a shadow, and where one of the other optical units cannot detect the shadow due to differences in optical characteristic conditions and to slight difference in detection-timing even though the detected shadow overlaps with no other shadows.

The first exemplary embodiment determines which of the conditions A to D each of the LR-combinations of the optical units corresponds to. According to results of this determination, the first exemplary embodiment then determines a detection state of each of the optical units of the sensor units 1L and 1R, in which shadows are detected, among the following detection states.

Detection State [1] in which the condition [1-1] holds in the case of each of all of the LR-combinations.

Detection State [2] in which there are two of the LR-combinations, for which the condition [2-2] holds.

Detection State [3] wherein there is one LR-combination, for which the condition [2-2] holds, and wherein there is another LR-combination, for which the condition [2-1] holds.

Detection State [4] in which there are two of the LR-combinations, for which the condition [2-1] holds.

Then, the first exemplary embodiment determines in steps S6 to S8, S10 and S11 a detection state of each of the optical units, in which the number of shadows is detected. Subsequently, the first exemplary embodiment performs coordinate calculation in steps S13 to S16 according to the following coordinate calculation methods preliminarily defined corresponding to the determined detection states, respectively. Subsequently, the first exemplary embodiment outputs results of the coordinate calculation in step S17. Meanwhile, if no detection state is determined, the first exemplary embodiment determines in step S9 or S12 that the detection of coordinates can be difficult. Then, the process is finished.

As illustrated in FIG. 6, the detection states [1] to [4] can be determined in this descending priority order. For example, in a case where the LR-combinations meet the detection states [3] and [4], the detection state [3] can be chosen to be determined.

Hereinafter, coordinate calculation methods [1] to [4] are described in detail.

Coordinate Calculation Method [1] (Step S13: Detection State [1])

In a case where the condition [1-1] holds in the case of all of the LR-combinations in the detection state [1], a single input is performed. In this case, there is no need for a true or false determination.

In this case, coordinate calculation can be performed by using the optical unites of any of the LR-combinations. For example, coordinate calculation is conducted by performing a coordinate calculation process (1), which will be described later, and by using the optical units of the LR-combination (L1, R1).

Coordinate Calculation Method [2] (Step S14: Detection State [2])

In the detection state [2], there are two or more of the LR-combinations (L1, R1), (L1, R2), (L2, R1), and (L2, R2), for which the condition [2-2] holds.

Two of these LR-combinations are selected. Then, four coordinate candidate points obtained from the selected two LR-combinations are compared with one another.

Hereinafter, practical examples of the detection state are described by being classified into three patterns. The three patterns are defined as detection states [2]-1, [2]-2, and [2]-3.

First, in the case of the detection state [2]-1 (see FIG. 7), the optical units R1 and R2 of the sensor unit 1R observe shading waveforms (or light intensity distributions) each having valleys respectively corresponding to two shadows, which are shown in FIGS. 8A and 8B.

Figure 7:
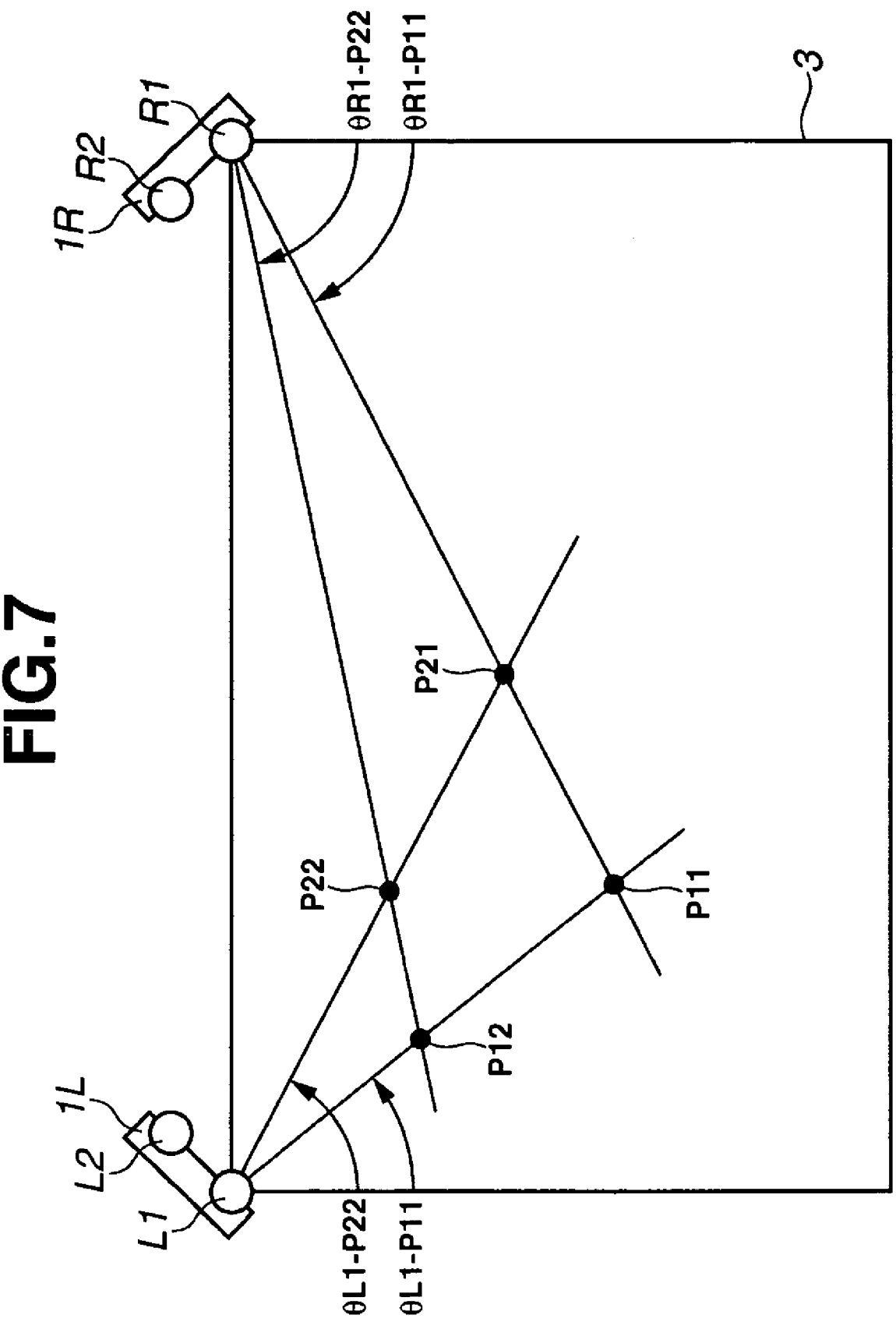
FIG. 7 is an explanatory view illustrating a coordinate calculation method according to the first exemplary embodiment.

For example, in a case where P12 and P21 designate actual input points among the four coordinate candidate points P11, P12, P21 and P22 shown in FIG. 7, the waveforms detected by the optical units R1 and R2 of the sensor unit 1R are compared with each other. A direction of a straight line (P12-P21) determined by these two points is relatively closer to a direction, in which the optical unit R1 is placed, than a direction in which the optical unit R2 is placed. That is, two shadows observed by the optical unit R1 are closer to each other than those observed by the optical unit R2. The distance between the observed two shadows corresponds to what is called a parallax.

That is, in a case where the candidate points P12 and P21 are actual input points, as is seen from FIG. 8A, the two shadows detected from the waveform observed by the optical unit R1 seem to be closer to each other than those detected from the waveform observed by the optical unit R2.

Meanwhile, in a case where the candidate points P11 and P22 shown in FIG. 7 are actual input points, as is seen from FIG. 8B, the two shadows detected from the waveform observed by the optical unit R2 seem to be closer to each other than those detected from the waveform observed by the optical unit R1.

That is, the true or false determination performed on the four coordinate candidate points shown in FIG. 7 can be achieved by determining which of the waveforms respectively observed by the optical units R1 and R2 corresponds to a smaller distance between the two shadows.

This holds true for the waveforms observed by the optical unit L1 of the sensor unit 1L shown in FIG. 7.

That is, the true or false determination can be achieved by determining which of the two optical units of each of the sensor units observes two shadows formed closer to each other.

Next, the true or false determination performed on the combinations of the four coordinate candidate points in the detection states illustrated in FIG. 9 (the detection state [2]-2) and FIG. 10 (the detection state [2]-3) is described below.

First, in the case of the detection state [2]-2 (see FIG. 9), a true or false determination performed by using the sensor unit 1L is described below.

Figure 9:
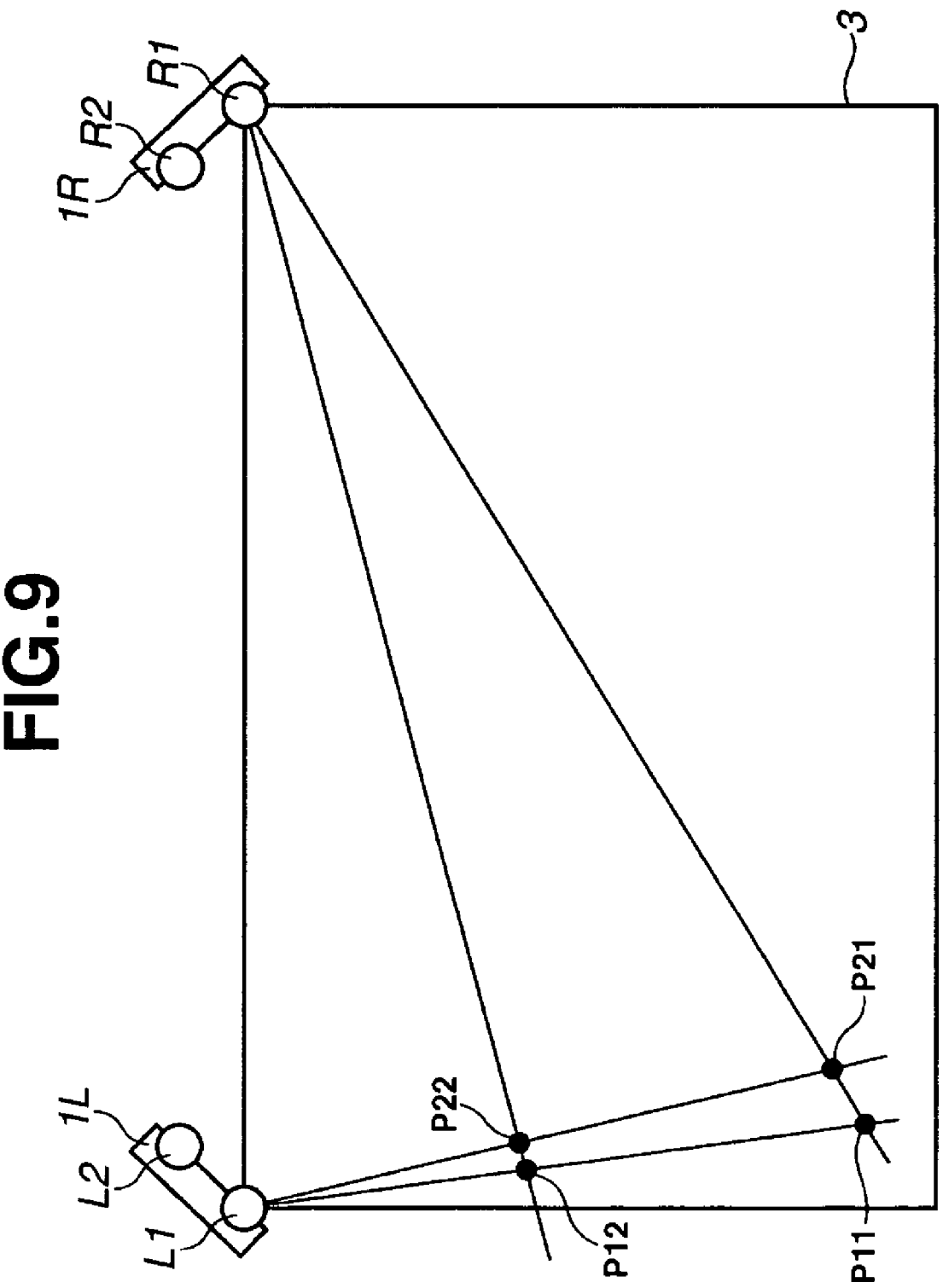
FIG. 9 is an explanatory view illustrating a coordinate calculation method according to the first exemplary embodiment.

For example, in a case where the candidate points P11 and P22 are actual input points, it is apparent from FIG. 9 that two shadows observed by the optical unit L2 are formed closer to each other than those observed by the optical unit L1.

In a case where the candidate points P12 and P21 are actual input points, it is apparent from FIG. 9 that two shadows observed by the optical unit L1 are formed closer to each other than those observed by the optical unit L2.

Thus, the true or false determination can be performed on the four coordinate candidate points by using the sensor unit 1L.

Next, the true or false determination performed on the four coordinate candidate points by using the sensor unit 1R is described below.

For example, in a case where the candidate points P11 and P22 are actual input points, it is apparent from FIG. 9 that two shadows observed by the optical unit R2 are formed closer to each other than those observed by the optical unit R1.

Conversely, in a case where the candidate points P12 and P21 are actual input points, two shadows observed by the optical unit R1 are not necessarily formed closer to each other than those observed by the optical unit R2.

Therefore, in this case, the true or false determination cannot be performed on the four coordinate candidate points by using the sensor unit 1R.

Next, in the case of the detection state [2]-3 (see FIG. 10), a true or false determination performed by using the sensor unit 1R is described below.

Figure 10:
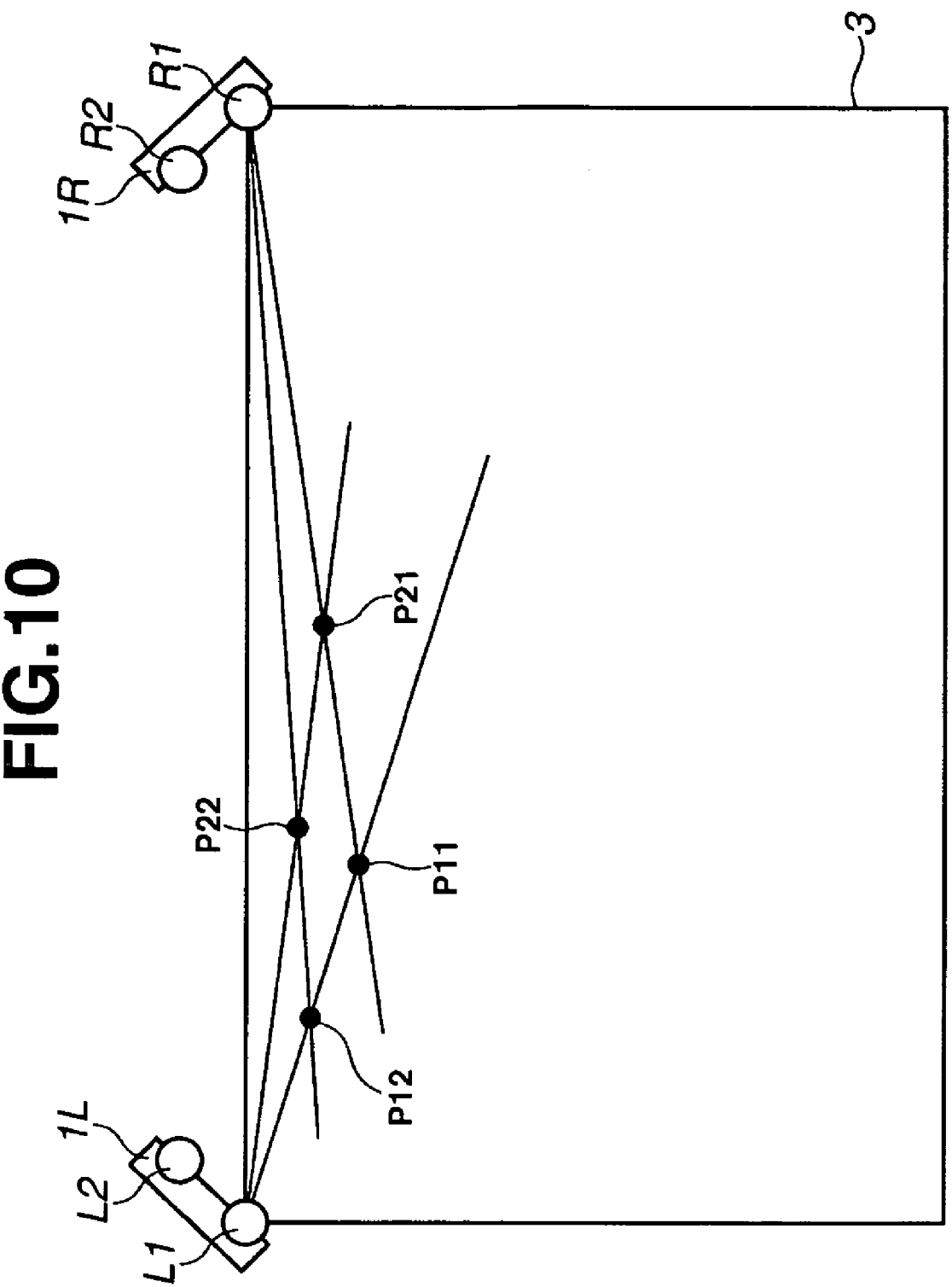
FIG. 10 is an explanatory view illustrating a coordinate calculation method according to the first exemplary embodiment.

For example, in a case where the candidate points P11 and P22 are actual input points, it is apparent from FIG. 10 that two shadows observed by the optical unit R2 are formed closer to each other than those observed by the optical unit R1.

In a case where the candidate points P12 and P21 are actual input points, it is apparent from FIG. 10 that two shadows observed by the optical unit R1 are formed closer to each other than those observed by the optical unit R2.

Consequently, the true or false determination can be performed on the four coordinate candidate points by using the sensor unit 1R.

Next, the true or false determination performed on the four coordinate candidate points by using the sensor unit 1L is described below.

For example, in a case where the candidate points P12 and P21 are actual input points, it is apparent from FIG. 10 that two shadows observed by the optical unit L1 are formed closer to each other than those observed by the optical unit L2.

Conversely, in a case where the candidate points P11 and P22 are actual input points, two shadows observed by the optical unit L2 are not necessarily formed closer to each other than those observed by the optical unit L1.

Therefore, in this case, the true or false determination cannot be performed on the four coordinate candidate points by using the sensor unit 1L.

Now, it is summarized below whether the true or false determination can be achieved in each of the detection states.

In the case of the detection state [2]-1 (see FIG. 7), the true or false determination can be achieved by using the sensor unit 1L. Also, the true or false determination can be achieved by using the sensor unit 1R.

In the case of the detection state [2]-2 (see FIG. 9), the true or false determination can be achieved by using the sensor unit 1L. Conversely, the true or false determination can be difficult when the sensor unit 1R is used.

In the case of the detection state [2]-3 (see FIG. 10), the true or false determination can be difficult when the sensor unit 1L is used. Conversely, the true or false determination can be achieved by using the sensor unit 1R.

Incidentally, causes for this result are generalized below.

Although principles of the true or false determination according to at least one exemplary embodiment have been described, important prerequisites for the true or false determination according to at least one exemplary embodiment are that the larger the angle $\theta L$ at the side of the sensor unit 1L of the candidate point becomes, the candidate point is placed closer to the sensor unit 1R, among the four coordinate candidate points, and that similarly, the larger the angle θR at the side of the sensor unit 1R of the candidate point becomes, the candidate point is placed closer to the sensor unit 1L.

For brevity of description, let L1 and R1 denote the approximate positions of the sensor units 1L and 1R, respectively (however, reference numerals L1 and R1 can designate the positions of the optical units L2 and R2, or can denote the positions of midpoints of the two optical units of the sensor units). The distances among the four coordinate candidate points P11, P12, P21, and P22 and the sensor units 1L and 1R shown in FIG. 7 should meet the following inequalities.

$$L1\text{-}P22 < L1\text{-}P11 \tag{11}$$

$$L1\text{-}P12 < L1\text{-}P21 \tag{12}$$

$$R1\text{-}P22 < R1\text{-}P11 \tag{13}$$

$$R1\text{-}P21 < R1\text{-}P12 \tag{14}$$

In a case where all of the inequalities (11) to (14) are satisfied, the true or false determination can be achieved in both of the case of using the sensor unit 1L and the case of using the sensor unit 1R.

In a case where the inequalities (11) and (12) are satisfied, the true or false determination can be achieved in the case of using the sensor unit 1L.

In a case where the inequalities (13) and (14) are satisfied, the true or false determination can be achieved in the case of using the sensor unit 1R.

In the case shown in FIG. 7, all of the inequalities (11) to (14) are satisfied. Thus, the true or false determination can be achieved in both of the case of using the sensor unit 1L and the case of using the sensor unit 1R.

In the case shown in FIG. 9, both of the inequalities (11) and (12) are satisfied. Thus, the true or false determination can be achieved in the case of using the sensor unit 1L. Meanwhile, in the case shown in FIG. 9, the inequality (14) is not satisfied. Thus, the true or false determination cannot be performed in the case of using the sensor unit 1R.

In the case shown in FIG. 10, both of the inequalities (13) and (14) are satisfied. Thus, the true or false determination can be achieved in the case of using the sensor unit 1R. Meanwhile, in the case shown in FIG. 10, the inequality (11) is not satisfied. Thus, the true or false determination cannot be performed in the case of using the sensor unit 1L.

As described above, according to at least one exemplary embodiment, in the case of the detection state [2], the sensor unit to be used in the true or false determination is selected according to whether each of the inequalities (11) to (14) is satisfied. The coordinate input apparatus can achieve the true or false determination without errors by inhibiting the sensor unit, the position of which does not satisfy at least one of the inequalities (11) to (14), from being selected.

Then, the coordinates of the points P11 and P12, or the points P12 and P21, are calculated by performing a coordinate calculation process (1), which will be described later, by using the optical units of the combination selected according to the true or false determination.

Coordinate Calculation Method [3] (Step S15: Detection State [3])

In the detection state [3], there are the LR-combination, for which the condition [2-2] holds, and the LR-combination, for which the condition [2-1] holds.

Hereinafter, the coordinate calculation method performed in a case, in which the combination (L1, R2) corresponds to the condition [2-2] and in which the combination (L1, R1) corresponds to the condition [2-1], is described as a practical example by referring to FIGS. 11 and 12.

In the case of the detection state [3], the following process can be performed.

First, in the detection state [3], there is one LR-combination corresponding to the condition [2-2]. Thus, four coordinate candidate points have already been determined in this stage. Then, actual input points can be determined by applying the true or false determination to the four coordinate candidate points. For instance, for this non-limiting example it is assumed that each of the optical units L1 and L2 of the sensor unit 1L observes two shadows, that only one of the optical units of the sensor unit 1R observes shadows which overlap, and that the other optical unit of the sensor unit 1R observes two shadows (see FIGS. 11 and 12).

In the case of a condition shown in FIG. 13A, in which two shadows are detected by the optical unit R2, and in which one shadow is detected by the optical unit R1, among four coordinate candidate points P11, P12, P21 and P22 determined by the optical unit R2 and one of the optical units of the sensor unit 1L, where the candidate points P12 and P21 are actual input points. If the candidate points P11 and P22 were actual input points, shadows observed by the optical unit R1 cannot overlap to thereby become a single shadow.

Similarly, in the case of a condition shown in FIG. 13B, in which two shadows are detected by the optical unit R1, and in which one shadow is detected by the optical unit R2, among four coordinate candidate points P11, P12, P21 and P22 determined by the optical unit R1 and one of the optical units of the sensor unit 1L, where the candidate points P12 and P21 are actual input points. If the candidate points P12 and P21 were actual input points, shadows observed by the optical unit R2 cannot overlap to thereby become a single shadow.

Thus, in the case of the detection state [3], when only one of the two optical units of one of the sensor units detects shadows that overlap, the coordinates of the actual input point can be determined as follows.

First, in a case where only one of the two optical units of one of the sensor units detects shadows that overlap, let T and U denote the one of the optical units and the other optical unit of the same sensor unit, respectively.

In a case where the optical unit T is placed near to the other sensor unit (that is, the optical unit L2 or R2), two coordinates (that is, the coordinates of the points P11 and P22) determined by shadows of two combinations, which are respectively detected by the two optical units belonging to the different sensor units and which respectively correspond to an angle near to and an angle far from a direction of the other sensor unit, are regarded as two actual input coordinates.

Meanwhile, in a case where the optical unit T is placed far from the other sensor unit (that is, the optical unit L1 or R1), two coordinates (that is, the coordinates of the points P12 and P21) determined by shadows of two combinations, which are respectively detected by the two optical units belonging to the different sensor units and which respectively correspond to a combination of an angle near to and an angle far from a direction of the other sensor unit and a combination of an angle far from and an angle near to the direction of the other sensor unit, are regarded as two actual input coordinates.

Then, in the case shown in FIG. 11, the coordinates of the points P11, P12, P21, and P22 are calculated by performing a coordinate calculation process (2), which will be described later, by using the optical units of the combination (L1, R2). Also, in the case shown in FIG. 12, the coordinates of the points PP1 and PP2 are calculated by performing a coordinate calculation process (1), which will be described later, by using the optical units of the combination (L1, R1).

Figure 11:
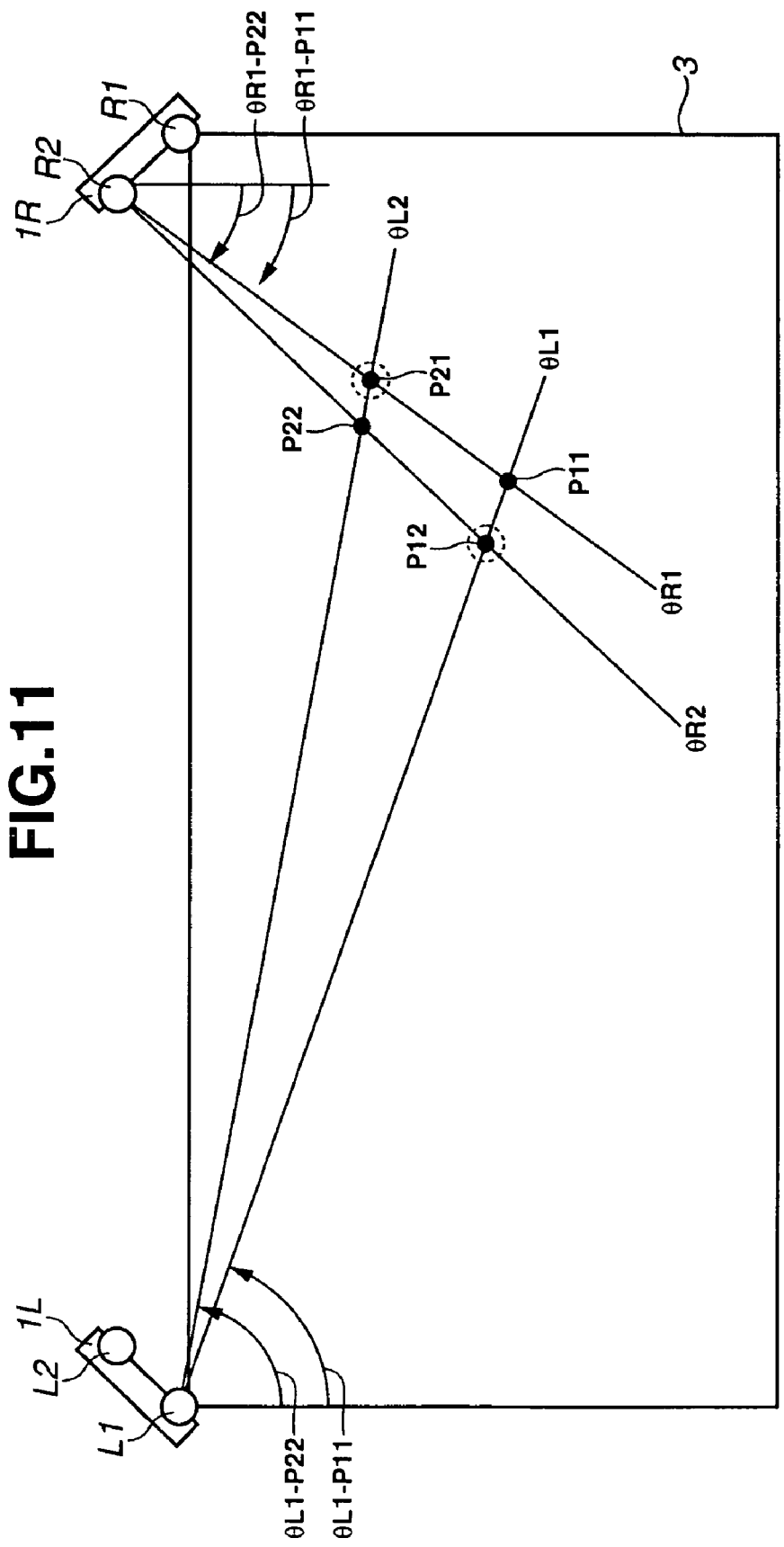
FIG. 11 is an explanatory view illustrating a coordinate calculation method according to the first exemplary embodiment.
Figure 12:
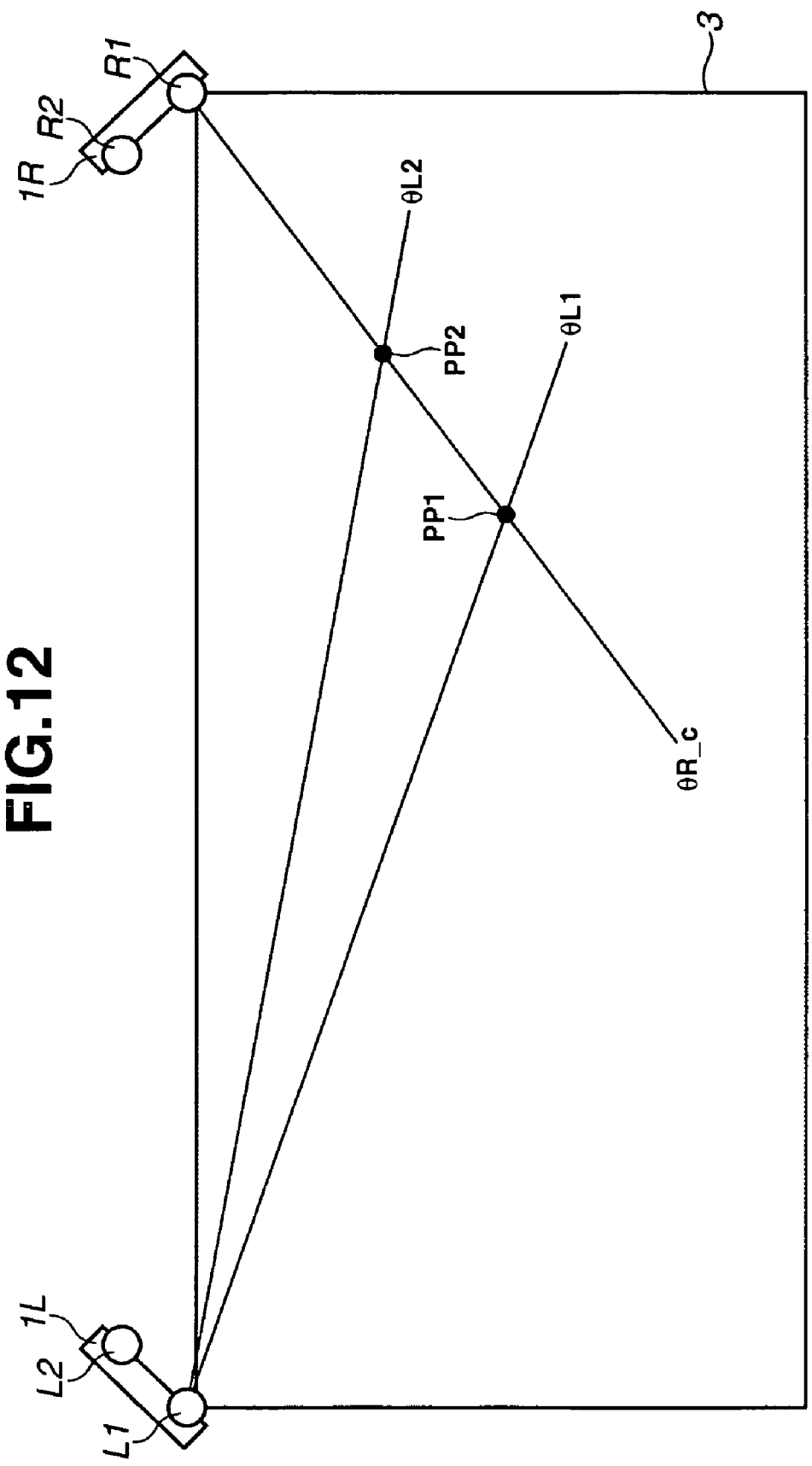
FIG. 12 is an explanatory view illustrating a coordinate calculation method according to the first exemplary embodiment.

Then, among the points P11, P12, P21, and P22 shown in FIG. 11, one of a combination of coordinate candidate points (P11, P22) and a combination of coordinate candidate points (P12, P21), which combination being relatively close to the points (PP1, PP2) shown in FIG. 12, is selected and is determined as the combination of coordinates of two input points.

In the examples shown in FIGS. 11 and 12, the candidate points P12 and P21 can be determined as two input points according to actual input data.

Coordinate Calculation Method [4] (Step S16: Detection State [4])

In the detection state [4], there are no LR-combinations, for which the condition [2-2] holds, and there are two LR-combinations, for which the condition [2-1] holds.

Hereinafter, the coordinate calculation method performed in a case in which the combination (L1, R2) corresponds to the condition [2-1] and the combination (L1, R1) corresponds to the condition [2-1] is described as a practical example by referring to FIGS. 14 and 15.

As illustrated in FIG. 14, the candidate points PP1 and PP2 can be determined according to a coordinate calculation process (2), which will be described later, by using the optical units of the combination (L1, R2). Also, as illustrated in FIG. 15, the candidate points PP1 and PP2 can be determined according to the coordinate calculation process (1), which will be described later, by using the optical units of the combination (L1, R1).

In this case, angles indicating directions of two virtual shadows that overlap are estimated from the overlapping shadows. According to the angles, the coordinates are calculated by a method related to that in the case where two shadows are detected.

In a practical example, as illustrated in FIGS. 14 and 15, overlapping shadows are detected by both of the optical units R2 and R1.

In this example, four coordinate candidate points are calculated by using a state detected by the optical unit R2 shown in FIG. 14.

Figure 16:
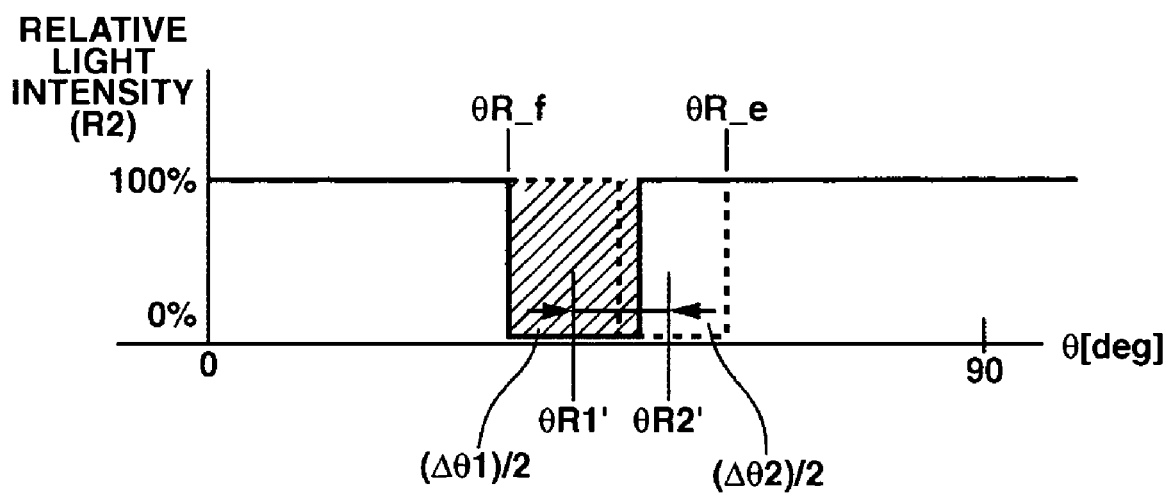
FIG. 16 is an explanatory view illustrating a coordinate calculation method according to the first exemplary embodiment.

First, it is assumed that information representing a diameter of the used pointer or a diameter of an end portion of the pointer is preliminarily set. Alternatively, it is assumed that the diameter of the used pointer or the diameter of an end portion of the pointer has been calculated at a past detection of coordinates. Also, the sizes of the shadows of the pointer, which are calculated according to the information representing the diameter thereof are assumed to be $\Delta\theta 1$ and $\Delta\theta 2$ shown in FIG. 16. Thus, angles $\theta R1'$ and $\theta R2'$ indicating the substantially central positions of the virtual shadows can be calculated as follows.

$$\theta R1' = \theta R\_f + \Delta\theta 1/2 \quad (15)$$

$$\theta R2' = \theta R\_e - \Delta\theta 2/2 \quad (16)$$

Thus, as illustrated in FIG. 17, the four coordinate candidate points P11, P12, P21, and P22 can be established by the combination of the optical units L1 and R2. Then, the true or false determination is performed on these coordinate candidate points.

As illustrated in FIG. 17, in a case where the candidate points P12 and P21 are actual input points, among the four coordinate candidate points P11, P12, P21, and P22 determined by the angle, which indicates the direction of the virtual shadow corresponding to the optical unit R2, and the two shadows corresponding to the optical unit L1, the overlapping rate of shadows corresponding to the optical unit R1 becomes larger. In contrast, in a case where the candidate points P11 and p22 are actual input points, the overlapping rate of shadows corresponding to the optical unit R1 becomes smaller.

That is, in a case where the widths $\Delta\theta R1\_fe$ and $\Delta\theta R2\_fe$ of the overlapping shadows respectively corresponding to the optical units R1 and R2 are defined as shown in FIGS. 18A and 18B, it is apparent that the smaller the values of the widths $\Delta\theta R1\_fe$ and $\Delta\theta R2\_fe$ become, the higher the overlapping rate of shadows becomes.

However, for example, in a case where the candidate points P12 and P21 are actual input points, the overlapping rate of shadows corresponding to the optical unit R1 is higher, as illustrated in FIG. 18A. That is, the value of the width $\Delta\theta R1\_fe$ is observed to be relatively smaller than the observed value of the width $\Delta\theta R2\_fe$.

In a case where the candidate points P11 and P22 are actual input points, the overlapping rate of shadows corresponding to the optical unit R2 is higher, as illustrated in FIG. 18B. That is, the value of the width $\Delta\theta R2\_fe$ is observed to be relatively smaller than the observed value of the width $\Delta\theta R1\_fe$.

That is, the true or false determination is achieved in the state [4] according to which of the values of the widths $\Delta\theta R1\_fe$ and $\Delta\theta R2\_fe$, that is, the values of $\Delta\theta R\_fe$, which respectively correspond to the optical units R1 and R2, is smaller.

Results of coordinate calculation in the case of one input point or two input points, which are obtained according to one of the aforementioned coordinate calculation methods [1] to [4], are outputted to an external terminal through a serial interface 7 and are displayed as a motion or a trajectory of a cursor in an output unit, such as an image display device.

Next, the coordinate calculation processes (1) to (3) are described in detail below.

Coordinate Calculation Process (1)

Hereinafter, the coordinate calculation process (1) of calculating coordinates using the combination of the optical units L1 and R1 is described by referring to FIG. 19.

Figure 19:
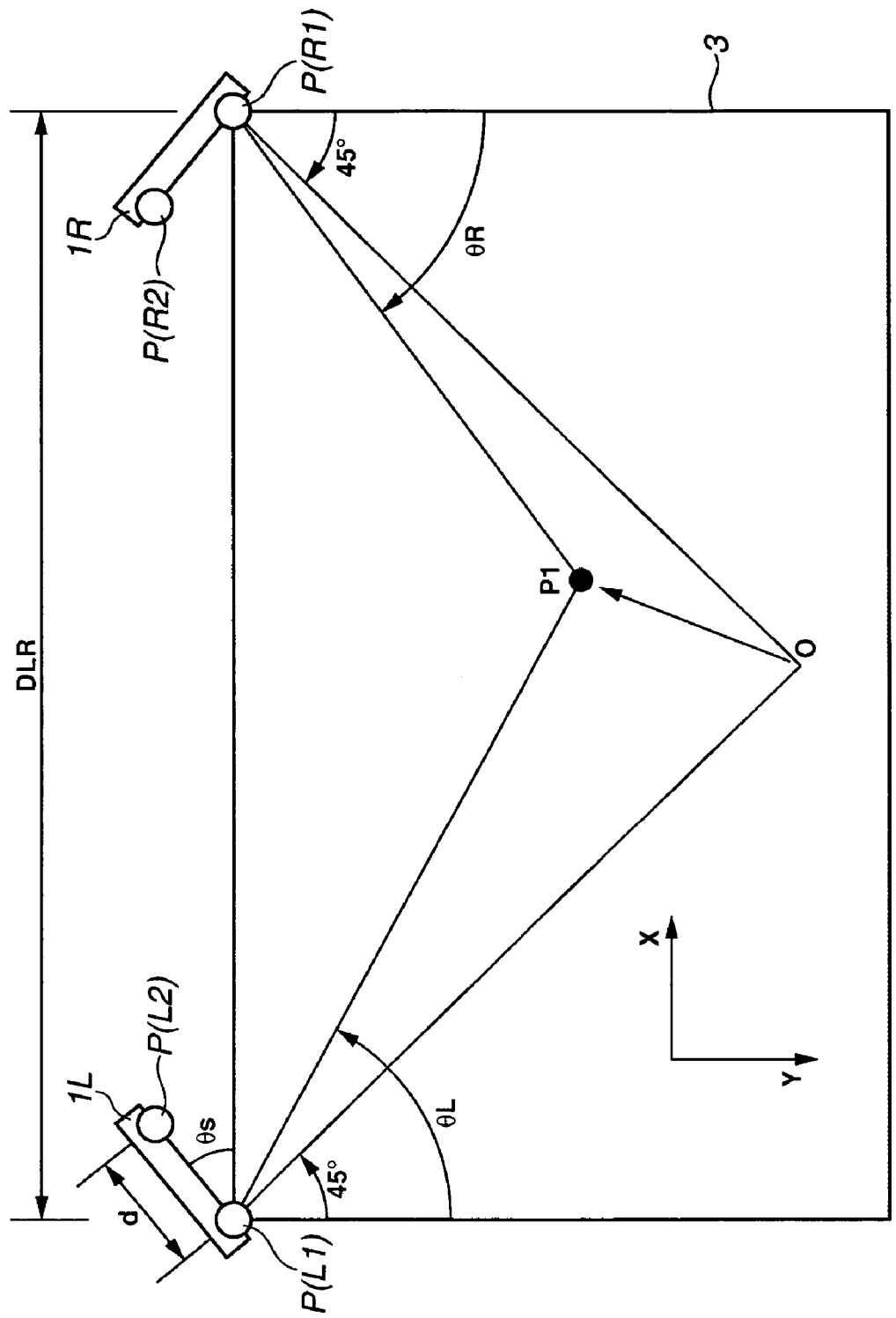
FIG. 19 is an explanatory view illustrating a coordinate calculation method according to the first exemplary embodiment.

Optical units provided at the outwardly left side and the outwardly right side of the coordinate input effective region 3 in the sensor units 1L and 1R, as viewed in FIG. 19, are the optical units L1 and R1, respectively. Optical units provided at the inwardly left side and the inwardly right side of the coordinate input effective region 3 in the sensor units 1L and 1R, as viewed in FIG. 19, are the optical units L2 and R2, respectively.

Angle data obtained from each of the optical units is defined so that an angle in a downward Y-axis direction of an associated sensor unit is set to be 0, and that the angle increases in inward directions in a left-right symmetric manner. Let P(L1), P(L2), P(R1), and P(R2) designate the coordinates of the positions of the optical units, respectively.

In a case where the coordinates are calculated according to the angle data obtained form the optical units of the combination (L1, R1), a point O is set to be an origin. Also, the following functions $X_t$ and $Y_t$ adapted to determine an X-direction and a Y-direction, as illustrated in FIG. 19, are defined.

$$X_t(\theta L-45, \theta R-45) = (\tan(\theta L-45) - \tan(\theta R-45))/[2*(1 - \tan(\theta L-45)*\tan(\theta R-45))] \quad (17)$$

$$Y_t(\theta L-45, \theta R-45) = (-1)*[(1-\tan(\theta L-45))*(1-\tan(\theta R-45))/(2*(1-\tan(\theta L-45)*\tan(\theta R-45)))-0.5] \quad (18)$$

According to the definitions of the functions $X_t$ and $Y_t$, the coordinates of the point P1(X, Y) are obtained as follows by setting the point O shown in FIG. 19 as an origin.

$$X = DLR * X_t(\theta L - 45, \theta R - 45) \quad (19)$$

$$Y = DLR * Y_t(\theta L - 45, \theta R - 45) \quad (20)$$

Coordinate Calculation Process (2)

Hereinafter, the coordinate calculation process (2) of calculating coordinates using the combination of the optical units L2 and R1 is described by referring to FIG. 20.

Figure 20:
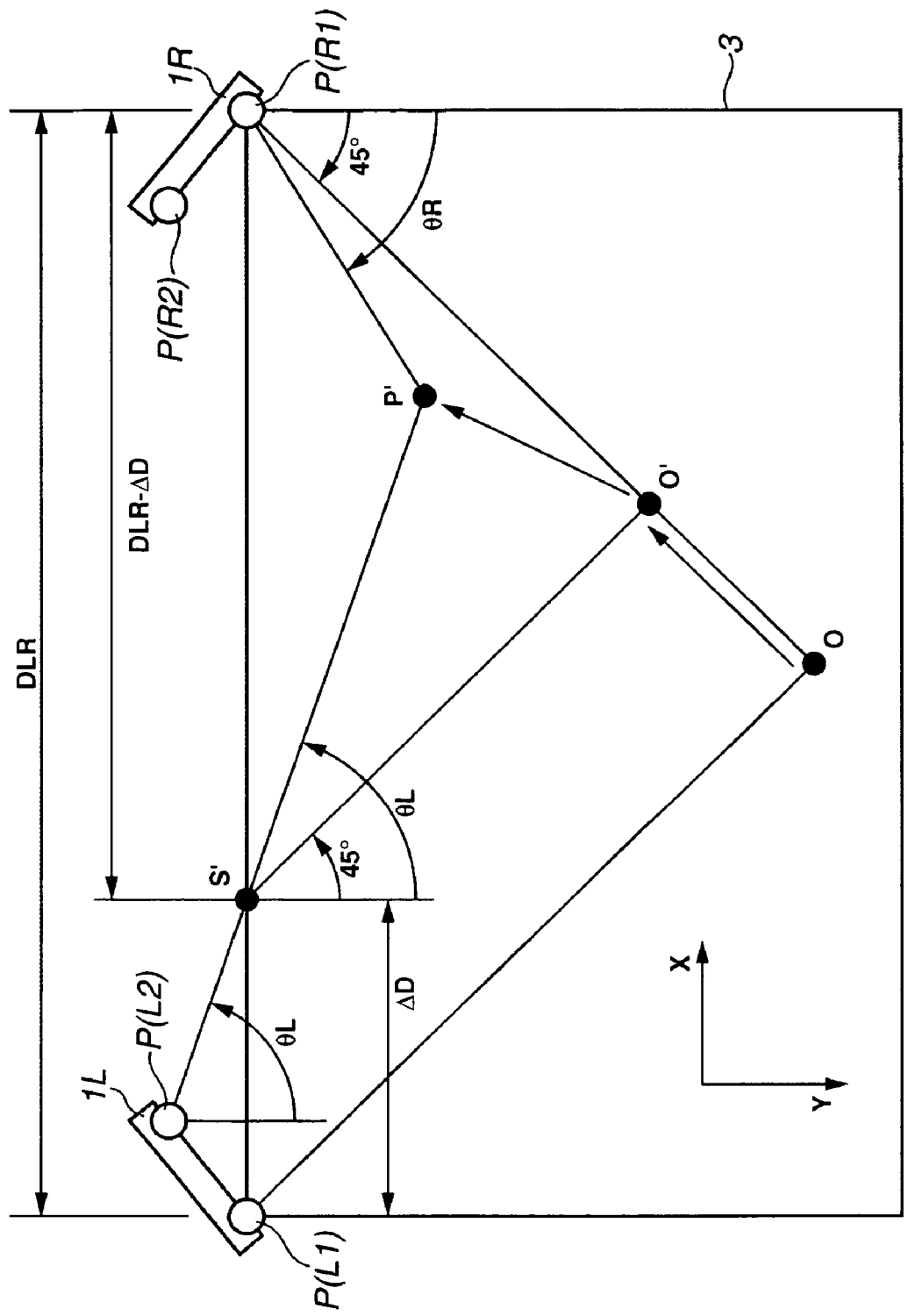
FIG. 20 is an explanatory view illustrating a coordinate calculation method according to the first exemplary embodiment.

In FIG. 20, let P' designate a position pointed by the pointer. Also, let S' denote an intersection of a straight line (P(L1)-P(R1)) and a straight line (P(L2)-P').

The calculation of the coordinates of the position P' from the positional relation among the three points S', P(R1), and O' shown in FIG. 20 is equivalent to that of the coordinates of the point P from the positional relation among the three points P(L1), P(R1), and O shown in FIG. 19.

Let $(O' \to P')_x$ designate a vector O'P'. Also, let $(O' \to P')_x$ and $(O' \to P')_y$ denote an X-component and a Y-component of this vector. Thus, the X-component and the Y-component of this vector are obtained as follows by using the equations (17) and (18).

$$(O' \to P')_x = (DLR - \Delta D) * X_t(\theta L - 45, \theta R - 45) \quad (21)$$

$$(O' \to P')_y = (DLR - \Delta D) * Y_t(\theta L - 45, \theta R - 45) \quad (22)$$

Incidentally, the following equations are obtained from FIG. 20.

$$\Delta D = S_x + S_y * \tan(\theta L) \quad (23)$$

$$\text{Incidentally, } S_x = d * \cos(\theta_S), S_y = d * \sin(\theta_S) \quad (24)$$

Also, as is apparent from FIG. 20, the following equations are obtained.

$$(O' \to O')_x = \Delta D/2 \quad (25)$$

$$(O' \to O')_y = (-1) * \Delta D/2 \quad (26)$$

Thus, the coordinates of the position P' can be calculated as the X-component and the Y-component of $(O \to P') = (O \to O') + (O' \to P')$ by setting the point O to be the origin.

Similarly, in a case where the coordinates are calculated by using the optical units L1 and R2 of the combination, the coordinates can similarly be calculated by changing the sign of the aforementioned X-component.

Coordinate Calculation Process (3)

Hereinafter, the coordinate calculation process (3) of calculating coordinates using the combination of the optical units L2 and R2 is described by referring to FIG. 21.

Figure 21:
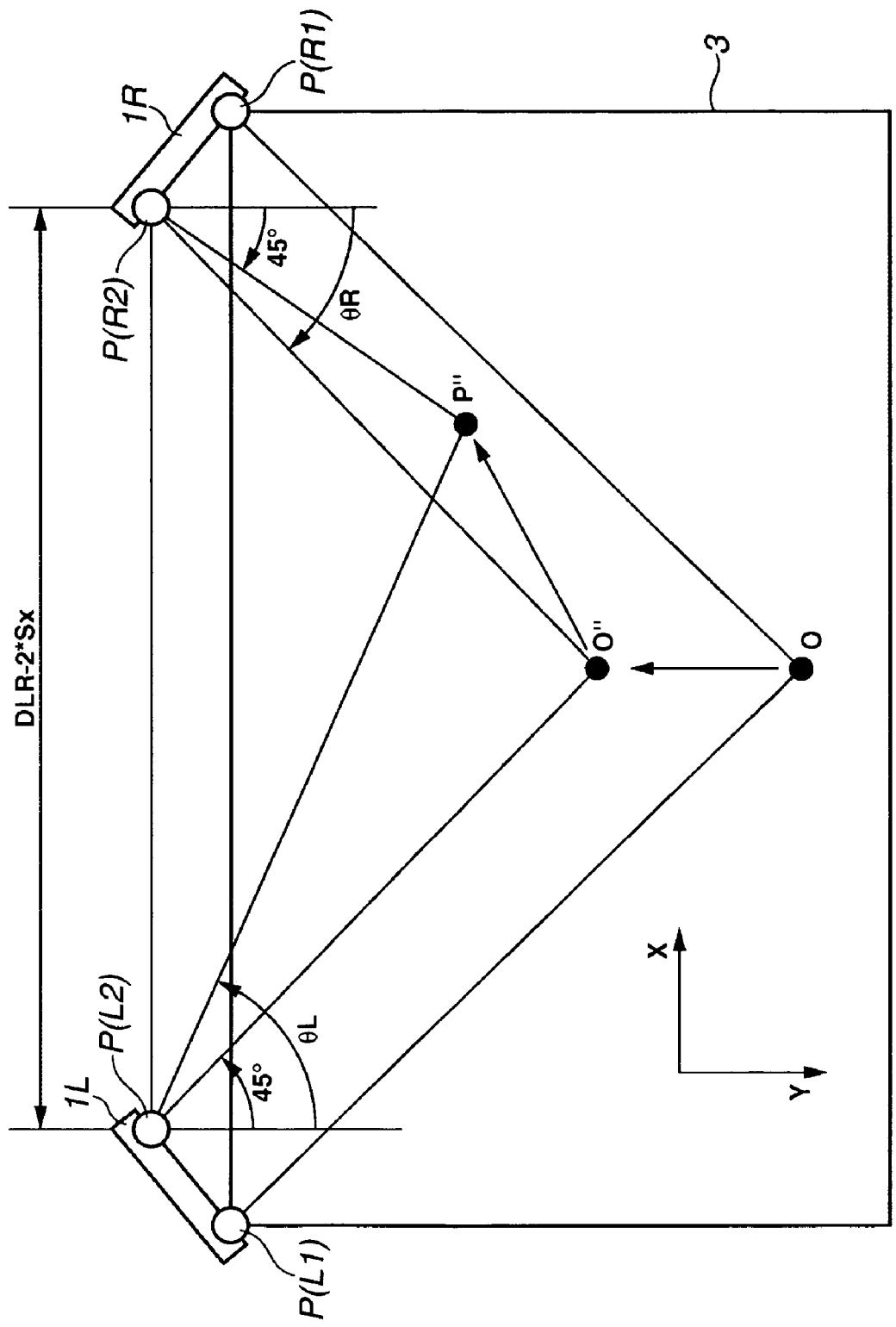
FIG. 21 is an explanatory view illustrating a coordinate calculation method according to the first exemplary embodiment.

The calculation of the coordinates of the position P" from the positional relation among the three points P(L2), P(R2) and O" shown in FIG. 21 is equivalent to that of the coordinates of the point P from the positional relation among the three points P(L1), P(R1), and O shown in FIG. 19. Let $(O'' \to P'')$ designate a vector O"P". Also, let $(O'' \to P'')_x$ and $(O'' \to P'')_y$ denote an X-component and a Y-component of this vector. Thus, the X-component and the Y-component of this vector are obtained as follows by using the equations (17) and (18).

$$(O'' \to P'')_x = (DLR - 2 * S_x) * X_t(\theta L - 45, \theta R - 45) \quad (27)$$

$$(O'' \to P'')_y = (DLR - 2 * S_x) * Y_t(\theta L - 45, \theta R - 45) \quad (28)$$

Also, as is apparent from FIG. 20, the following equations are obtained.

$$(O \to O'')_x = 0 \quad (29)$$

$$(O \to O'')_y = (-1) * (S_x + S_y) \quad (30)$$

Thus, the coordinates of the position P" can be calculated as the X-component and the Y-component of $(O \to P'') = (O \to O'') + (O'' \to P'')$ by setting the point O to be the origin.

As described above, the coordinates can be calculated corresponding to a substantial portion of the LR-combinations in the first exemplary embodiment.

Thus, the first exemplary embodiments determines the optical unit that detects the shadows, which are observed to be closer to each other than the shadows detected by the other of the two optical units of both or one of the sensor units. As illustrated in FIG. 8A, the first exemplary embodiment assumes the following parameters as the parameter indicating the degree of closeness of two shadows:

a first parameter $\Delta \theta R\_MIDDLE$ (a first angle corresponding to the distance between the substantial middles of the shadows);

a second parameter $\Delta \theta R\_INSIDE$ (a second angle corresponding to the distance between the inner ends of the shadows);

a third parameter $\Delta \theta R\_OUTSIDE$ (a third angle corresponding to the distance between the outer ends of the shadows); and a fourth parameter that is equal to (the second angle/the third angle) or to (the second angle/the first angle)

In a case where one of these parameters is relatively small, as compared with the other parameters, it is determined that the two shadows observed by the optical unit to be used are close to each other. Then, the true or false determination is performed by using the optical unit having made this determination.

Especially, the true or false determination using these four kinds of parameters is used in the coordinate calculation process in the aforementioned detection state [2].

Figure 22:
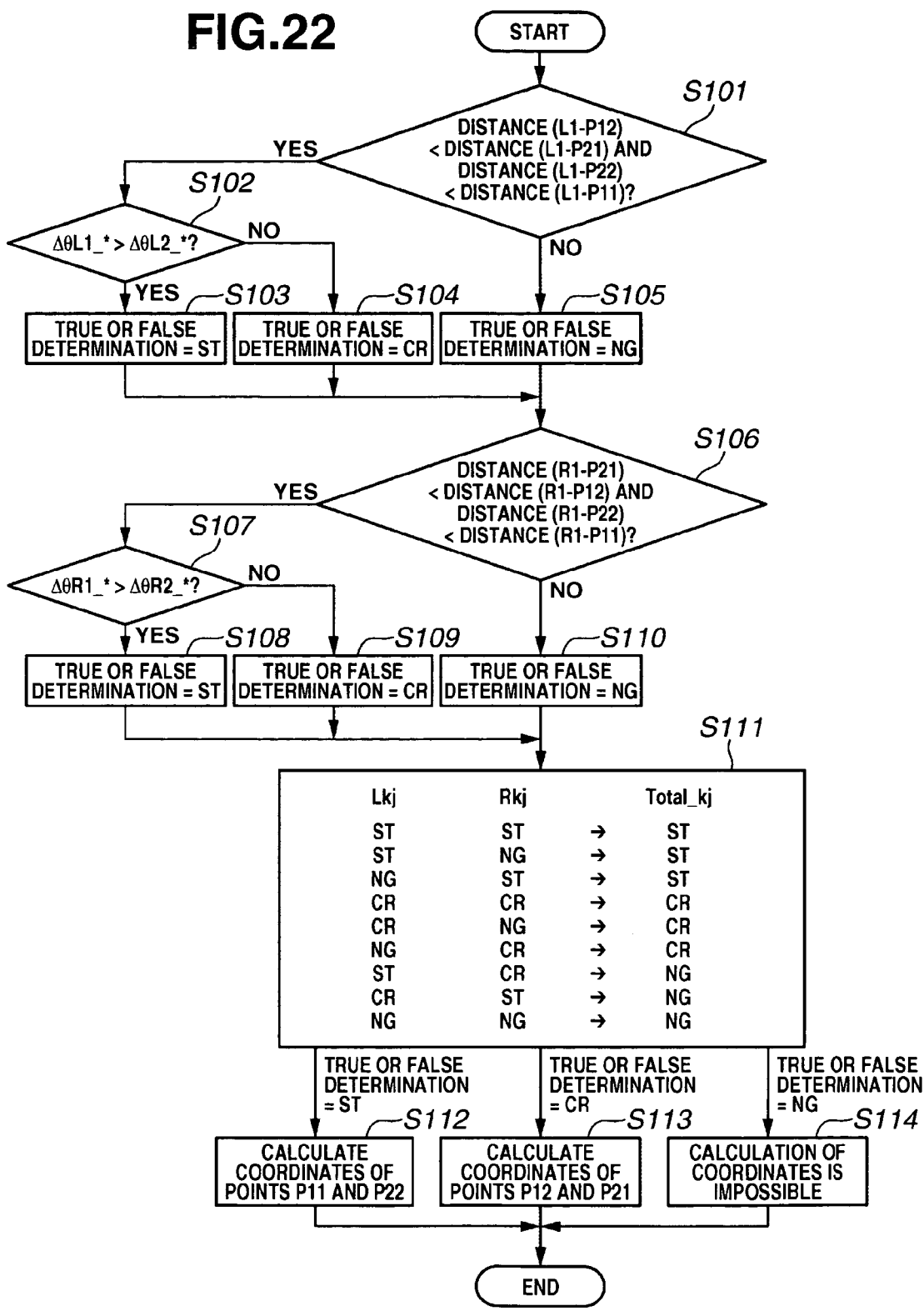
FIG. 22 is a flowchart illustrating a coordinate calculation process in a detection state [2] of the first exemplary embodiment in detail.

Hereinafter, the coordinate calculation process performed in the detection state [2] is described in detail by referring to FIG. 22. That is, the coordinate calculation process performed in a case, in which there are two or more of LR-combinations, for which the condition [2-2] holds, are obtained among the LR-combinations (L1, R1), (L1, R2), (L2, R1), and (L2, R2), is described below in detail. FIG. 22 is a flowchart illustrating the coordinate calculation process in the detection state [2] of the first exemplary embodiment in detail.

Figure 23:
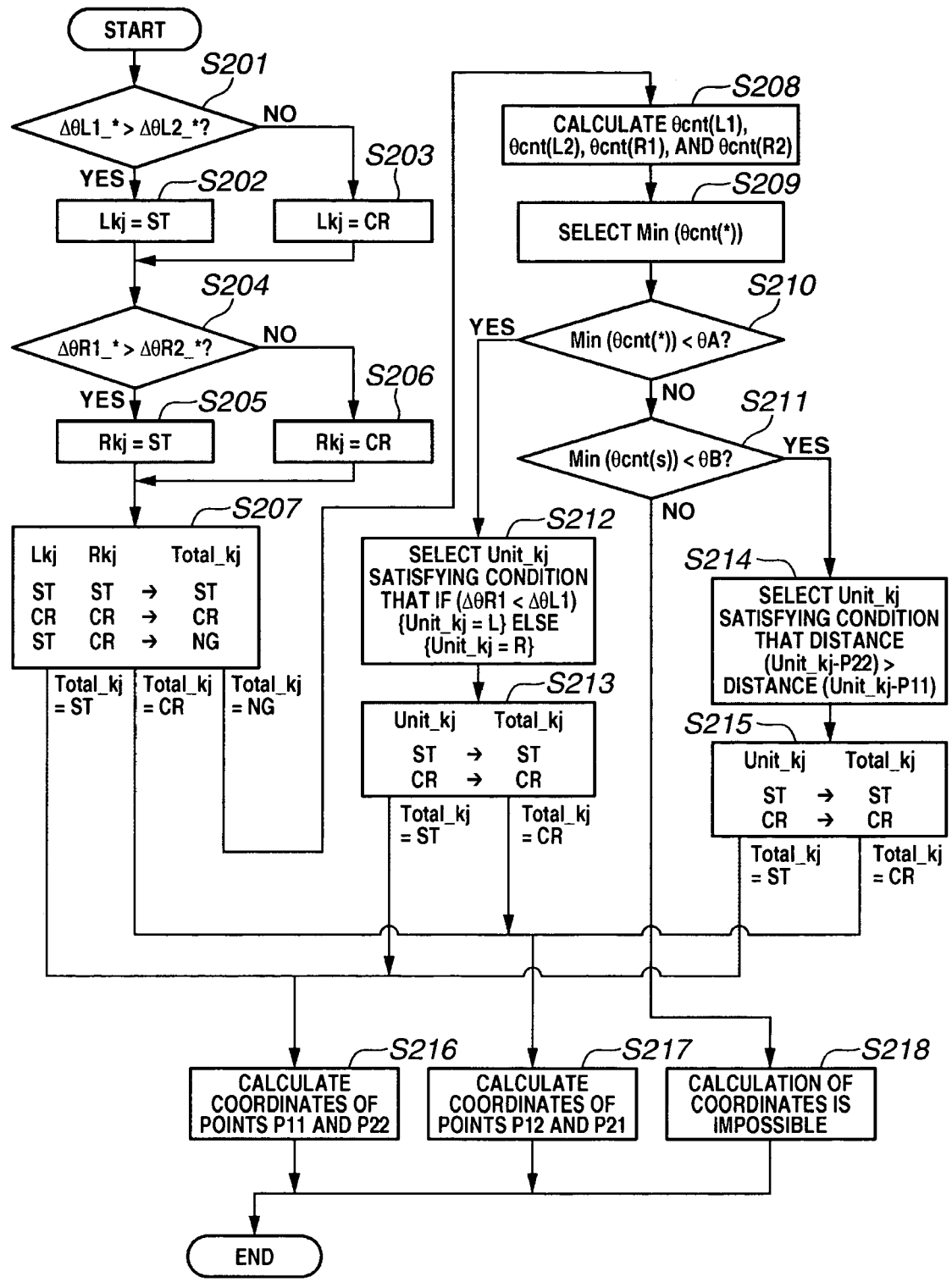
FIG. 23 is a flowchart illustrating a coordinate calculation process in a detection state [2] of a second exemplary embodiment of the present invention in detail.

Terms described in FIG. 22 or FIG. 23 showing a second exemplary embodiment (to be described later) are defined as follows.

Distance (*1-*2): a distance between points *1 and *2.

Total_kj: a comprehensive true or false determination.

Lkj: a true or false determination by using the sensor unit 1L.

Rkj: a true or false determination by using the sensor unit 1R.

Unit_kj: a true or false determination by using one of the selected sensor units.

ST: a true or false determination using input points P11 and P22 as actual coordinates.

CR: a true or false determination using input points P11 and P22 as actual coordinates.

NG: a true or false determination is impossible.

Min($\theta$cnt(*)): a minimum value of $\theta$cnt(*) in all of the optical units In the first exemplary embodiment, according to whether the inequalities (11) to (14) are satisfied, it is determined whether the true or false determination using the sensor units is achieved. Thus, the following process illustrated in FIG. 22 is performed.

First, in step S101, it is determined whether the true or false determination using the sensor unit 1L can be achieved. In this step, it is determined whether the inequalities (11) and (12) (L1-P22<L1-P11 and L1-P12<L1-P21) are satisfied.

If the inequalities (11) and (12) are not satisfied (NO in step S101), the process advances to step S105, where it is determined that the true or false determination using the sensor unit 1L can be difficult (Lkj=NG). Conversely, if the inequalities (11) and (12) are satisfied (YES in step S101), the process advances to step S102.

In step S102, it is determined which of the optical units L1 and L2 of the sensor unit 1L observes shadows to be relatively closer to each other than shadows observed by the other optical unit. In this step, this determination is according to the magnitude of the angle (the smaller the magnitude of the angle is, the closer to each other the shadows become). The magnitude of the angle is represented by the expression $\Delta\theta L\_*$ ("*" is one of "OUTSIDE", "INSIDE" and "MIDDLE"). Thus, as is seen from FIGS. 8A and 8B, the degree of closeness of the two shadows is determined according to one of $\Delta\theta L\_OUTSIDE$, $\Delta\theta L\_INSIDE$, $\Delta\theta L\_MIDDLE$, $(\Delta\theta L\_INSIDE/\Delta\theta L\_MIDDLE)$, and $(\Delta\theta L\_INSIDE/\Delta\theta L\_OUTSIDE)$.

If $\Delta\theta L1\_* > \Delta\theta L2\_*$ (YES in step S102), the process advances to step S103. The equation Lkj=ST represents a result of determining whether the true or false determination using the sensor unit 1L can be achieved. Conversely, if the inequality ($\Delta\theta L1\_* > \Delta\theta L2\_*$) is not satisfied (NO in step S102) the process advances to step S104. The equation Lkj=CR represents a result of determining whether the true or false determination using the sensor unit 1L can be achieved.

Similarly, to determine whether the true or false determination using the sensor unit 1R can be achieved, steps S106 to S110, which correspond to steps S101 to S105, are performed. In step S106, it is determined whether the inequalities (13) and (14) (R1-P21<R1-P12 and R1-P22<RL-P1) are satisfied. In step S107, it is determined whether the following inequality $\Delta\theta R1\_* > \Delta\theta R2\_*$ is satisfied.

In step S111, a comprehensive true or false determination, that is a final true or false determination is performed according to results of the determination on which the true or false determination using the sensor unit 1L or 1R can be achieved. In this case, St, CR, or NG is determined as a value representing a result of the comprehensive true or false determination Total_kj according to values of Lkj and Rkj, which are results of the true or false determination by using the sensor unit 1L and the true or false determination by using the sensor unit 1R and are shown in step S111 in the flowchart.

If Total_kj=ST, the candidate points P11 and P22 are employed as actual input points and the coordinates of these points are calculated in step S112. If Total_kj=CR, the candidate points P12 and P21 are employed as actual input points and the coordinates of these points are calculated in step S113. If Total_kj=NG, it is determined in step S114 that the detection of the coordinates can be difficult.

As described above, in the light-shielding type coordinate input apparatus according to the first exemplary embodiment, the sensor units are configured in the vicinities of both ends of one side of the coordinate input effective region. In each of the sensor units, the two optical units adapted to detect angles corresponding to angle information, which represents the directions of shadows or images generated by causing the pointer to enter the coordinate input effective region, are disposed apart from each other by a predetermined parallax (or distance).

The coordinates of the positions of the pointers in a case, in which the pointers concurrently enter the coordinate input effective region, are calculated by using the combination of pieces of angle information on angles of shadows detected by the two optical units of the different sensor units and the combination of pieces of angle information on angles of shadows detected by the two optical units of the same sensor unit.

In the first exemplary embodiment, especially, in a case where shadows associated with two input points do not overlap even when observed by any of the optical units, the sensor unit to be used to perform a true or false determination is determined according to predetermined conditions (or the relation in distance among the coordinate candidate points). The true or false determination is performed by using results of the detection by the two optical units of the selected sensor unit and by also using the parallax.

Consequently, regardless of whether detected shadows overlap, the true or false determination can stably be performed. In a case where a plurality of inputs can concurrently be performed, a coordinate calculation operation of the coordinate input apparatus can be stabilized and assured.

Second Exemplary Embodiment

A second exemplary embodiment is an application of the first exemplary embodiment.

In the coordinate calculation process in the detection state [2] described in the foregoing description of the first exemplary embodiment, in a case where there are two or more of the LR-combinations (L1, R1), (L1, R2), (L2, R1), and (L2, R2), for which the condition [2-2] holds, the sensor unit to be used to perform the true or false determination is selected according to the inequalities (11) to (14). Then, the coordinate calculation process is performed by using the selected sensor unit.

In a case where each of the inequalities (11) to (14) is not satisfied in the detection states illustrated in FIGS. 7, 9, and 10, the arrangement of the four coordinate candidate points has distinct features.

In the case illustrated in FIG. 7 (the detection state [2]-1), the inequality (11) is satisfied, so that there is no deviation in the arrangement of the four coordinate candidate points.

In the case illustrated in FIG. 9 (the detection state [2]-2), the four coordinate candidate points constitute a flat rectangle. An angle detected by one of the sensor units 1L and 1R is close to zero (that is, the coordinate candidate points are close to the left side or the right side of the coordinate input effective region 3, as viewed in this figure).

For example, in a case where two shadows detected by the sensor unit 1L are closer to each other, as compared with shadows detected by the sensor unit 1R, the true or false determination using the sensor unit 1L is achieved. However, the true or false determination using the sensor unit 1R is not performed. Conversely, in a case where the two shadows detected by the sensor unit 1R are closer to each other, as compared with shadows detected by the sensor unit 1L, the true or false determination by using the sensor unit 1R is achieved. However, the true or false determination using the sensor unit 1L is not performed.

In the case illustrated in FIG. 10 (the detection state [2]-3), the four coordinate candidate points are concentrated in the vicinity of a central part of the top side of the coordinate input effective region 3. In this case, the angles detected by the sensor units 1L and 1R are relatively close to 90 degrees.

In this case, sometimes, the points P11 and P22 do not satisfy the inequalities (11) to (14). For instance, in the case illustrated in FIG. 10, the point P22 is positioned far from the sensor unit 1L, as compared with the point 11. Thus, the true or false determination using the sensor unit 1L cannot be achieved.

On the other hand, the true or false determination using the sensor unit 1R can be achieved. It is geometrically obvious that the points P11 and P22 do not simultaneously satisfy the inequalities (11) and (13) and that the points P11 and P22 satisfy one of the inequalities (11) and (13) at all times.

Therefore, in the case illustrated in FIG. 10, only the coordinate candidate points P11 and P22 are detected. Then, it is determined according to the coordinate candidate points P11 and P22 whether each of the inequalities (11) and (13) is satisfied. Subsequently, according to a result of the determination, the true or false determination and the coordinate calculation are performed.

Hereinafter, a coordinate calculation process in the detection state [2] of the second exemplary embodiment is described in detail by referring to FIG. 23.

FIG. 23 is a flowchart illustrating the coordinate calculation process in the detection state [2] of the second exemplary embodiment in detail.

First, in step S201, it is determined whether the true or false determination using the sensor unit 1L can be achieved. In this step, it is determined whether the inequality ($\Delta\theta L1\_*>\Delta\theta L2\_*$) is satisfied, instead of whether the inequalities (11) and (12) (L1-P22<L1-P11 and L1-P12<L1-P21) are satisfied.

If the inequality $\Delta\theta L1\_*>\Delta\theta L2\_*$ is satisfied (YES in step S201), the process advances to step S202. The equation Lkj=ST represents a result of determining whether the true or false determination using the sensor unit 1L can be achieved. Conversely, if the inequality ($\Delta\theta L1\_*>\Delta\theta L2\_*$) is not satisfied (NO in step S201), the process advances to step S203. The equation Lkj=CR represents a result of determining whether the true or false determination using the sensor unit 1L can be achieved.

Similarly, to determine whether the true or false determination using the sensor unit 1R can be achieved, steps S204 to S206, which correspond to steps S201 to S203, are performed. In step S204, it is determined whether the inequality ($\Delta\theta R1\_*>\Delta\theta R2\_*$) is satisfied, instead of whether the inequalities (13) and (14) (R1-P21<R1-P12 and R1-P22<R1-P11) are satisfied.

In step S207, a comprehensive true or false determination, that is a final true or false determination is performed according to results of the determination on which the true or false determination using the sensor unit 1L or 1R can be achieved. In this case, ST, CR, or NG is determined as a value representing a result of the comprehensive true or false determination Total_kj according to values of Lkj and Rkj, which are results of the true or false determination by using the sensor unit 1L and the true or false determination by using the sensor unit 1R and are shown in step S207 in the flowchart.

If Total_kj=ST, the candidate points P11 and P22 are employed as actual input points and the coordinates of these points are calculated in step S216. If Total_kj=CR, the candidate points P12 and P21 are employed as actual input points and the coordinates of these points are calculated in step S217. If Total_kj=NG, the process advances to step S208.

Thus, if it is determined in step S207 that the result of the true or false determination using the sensor unit 1L is the same as the result of the true or false determination using the sensor unit 1R, the result of the true or false determination is settled. This is the state (the detection state [2]-1) shown in FIG. 7.

Conversely, if the result of the true or false determination using the sensor unit 1L differs from the result of the true or false determination using the sensor unit 1R, the result of the comprehensive true or false determination is once set so that Total_kj=NG. In this case, one of the true or false determination using the sensor unit 1L and the true or false determination using the sensor unit 1R is erroneous. That is, this is the state shown in FIG. 9 or 10 (that is, the detection state [2]-2 or (2)-3. Thus, to specify the erroneous true or false determination, a process subsequent to step S208 is performed.

Incidentally, θcnt(*) is defined as follows.

$$\theta cnt(L1)=(\theta L1-aP11+\theta L1-aP22)/2$$

$$\theta cnt(L2)=(\theta L2-aP11+\theta L2-aP22)/2$$

$$\theta cnt(R1)=(\theta R1-aP11+\theta L1-aP22)/2$$

$$\theta cnt(R2)=(\theta R2-aP11+\theta L1-aP22)/2$$

Suffixes L1, L2, R1, and R2 added to θ indicate that angles E are respectively detected by the optical units L1, L2, R1, and R2. Also, aP11 and aP22 represent angles respectively associated with the coordinate candidate points P11 and P22. Thus, an angle designated by aP22 is larger than an angle indicated by aP11 (that is, the direction of aP22 is closer to the top side of the coordinate input effective region 3).

In step S208, the angles θcnt(*) corresponding to the optical units L1, L2, R1, and R2 are calculated. In step S209, a minimum value Min(θcnt(*)) of θcnt(*) is selected. Subsequently, in step S210, it is determined whether Min(θcnt(*)) is less than a predetermined angle θA (for example, 45 degrees). If Min(θcnt(*)) is less than the predetermined angle A (YES in step S210), the state is deduced to be the detection state [2]-2. Then, the process proceeds to step S212.

In step S212, a determination is performed to select the sensor unit whose optical units detect the shadows which are closer to each other than shadows detected by the other sensor unit. The optical unit is selected by comparing $\Delta\theta L$ with $\Delta\theta R$. Practically, an optical unit (Unit_kj), which satisfies the inequality $\Delta\theta L<\Delta\theta R$, is selected from the optical unit 1L (Unit_kj=L) and the optical unit 1R (Unit_kj=R).

Then, in step S213, the true or false determination using the optical unit selected by the determination in step S212 is definitely determined. Thereafter, the process proceeds to step S216 or S217 according to a result of the comprehensive true or false determination.

On the other hand, if it is determined in step S210 that Min(θcnt(*)) is equal to or more than the predetermined angle θA (NO in step S210), the process advances to step S211, wherein it is determined whether Min(θcnt(*)) is equal to or more than the predetermined angle θB (for example, 60 degrees). If it is determined that Min(θcnt(*)) is larger than the predetermined angle θB, the state is deduced to be the detection state [2]-3. Then, the process advances to step S214.

In step S214, the sensor unit satisfying the inequality (11) or (13) (Distance Unit_kj-P22>Distance Unit_kj-P11) is selected.

Then, in step S215, the true or false determination using the optical unit selected by the determination in step S214 is definitely determined as a final comprehensive true or false determination. Thereafter, according to a result of the comprehensive true or false determination, the process proceeds to step S216 or S217.

On the other hand, if it is determined in step S211 that Min(θcnt(*)) is less than the predetermined angle θB (NO in step S211), that is, θA<Min(θcnt(*))<θB, it is determined in step S218 that the true or false determination can be difficult. Consequently, it is definitely determined that the detection of the coordinates can be difficult.

As described above, according to the second exemplary embodiment, the sensor unit to be used to perform the true or false determination is selected according to a predetermined condition (that is, the predetermined relation between the angle and the coordinate candidate point) in the apparatus according to the first exemplary embodiment in a case where shadows associated with two input points do not overlap even when observed from any of the optical units. Then, the true or false determination is performed by using the result of the detection by the two optical units of the selected sensor unit and also using the parallax.

Consequently, regardless of whether detected shadows overlap, the true or false determination can stably be performed. In a case where a plurality of inputs can concurrently be performed, a coordinate calculation operation of the coordinate input apparatus can be stabilized and assured.

Third Exemplary Embodiment

In the foregoing description of the first exemplary embodiment and the second exemplary embodiment, the methods of performing the true or false determination, which is performed in a case where essentially, shadows do not overlap in the light intensity distribution observed by the selected sensor unit have been described. In the following description of the third exemplary embodiment, a true or false determination method performed in a case, in which shadows are essentially observed to overlap on the light intensity distribution observed by the selected sensor unit, is described.

The following conditions obtained according to the combinations of shadows, which correspond to the LR-combinations, are studied.

Condition A (1-1) in which both of the optical units detects only one shadow.

Condition B1 (2-1) in which one of the optical units of one of the sensor units detects two shadows, and in which one of the optical units of the other sensor unit detects only one overlapping shadow.

Condition C1 (2-2) in which both of the sensor units detect two shadows.

Condition D (0-0) in which each of the optical units detects no shadows.

The third exemplary embodiment determines which of the conditions A, B1, C1, and D each of the LR-combinations of the optical units corresponds to. According to results of this determination, the third exemplary embodiment then determines a detection state of each of the optical units of the sensor units 1L and 1R, in which shadows are detected, among the following detection states.

Although the detection states, in which the number of shadows is detected, are related to those in the first exemplary embodiment, the coordinate calculation methods respectively corresponding to the detection states [1] to [4] differ from those in the first exemplary embodiment. Thus, the differences between the third exemplary embodiment and the first exemplary embodiment are described hereinbelow.

First, in the detection states [1] and [3], the coordinate calculation methods [1] and [3] are performed, similarly to the first exemplary embodiment.

In the detection state [2], the coordinate calculation method [2] according to the third exemplary embodiment, which method differs from the coordinate calculation method [2] according to the first exemplary embodiment, is performed. Hereinafter, the coordinate calculation method [2] according to the third exemplary embodiment is described.

Coordinate Calculation Method [2]

In the detection state [2], there are two or more of the LR-combinations (L1, R1), (L1, R2), (L2, R1), and (L2, R2), for which the condition [2-2] holds.

Two of these LR-combinations are selected. Then, four coordinate candidate points obtained from the selected two LR-combinations are compared with one another.

Hereinafter, a case, in which the combination (L1, R1) and the combination (L2, R1) corresponds to the condition [2-2], is described as a practical example by referring to FIGS. 24 and 25.

Figure 24:
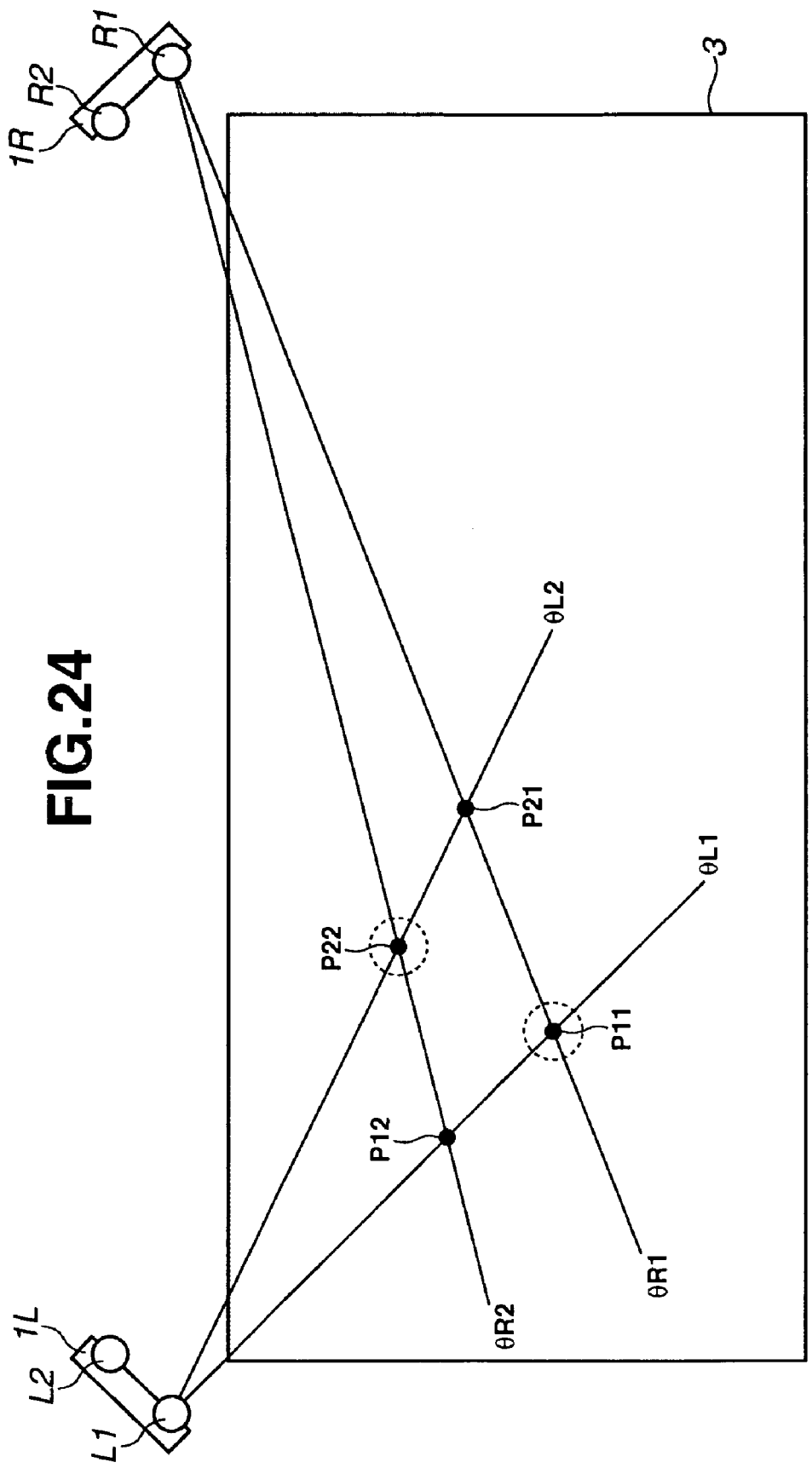
FIG. 24 is an explanatory view illustrating a coordinate calculation method according to the second exemplary embodiment.

As illustrated in FIG. 24, the candidate points P11, P12, P21, and P22 can be determined according to the aforementioned coordinate calculation process (1) using the optical units of the combination (L1, R1). Similarly, as illustrated in FIG. 25, the candidate points P'11, P'12, P'21, and P'22 can be determined according to the aforementioned coordinate calculation process (2) using the optical units of the combination (L2, R1).

The values of the coordinates of the four candidate points obtained corresponding to the LR-combination (L1, R1) are compared with those of the coordinates of the four candidate points obtained corresponding to the LR-combination (L2, R1).

Among these coordinate candidate points, the coordinate candidate points based on actually inputted coordinates, which respectively correspond to both of the LR-combinations, have the same coordinates in principle. On the other hand, the coordinate candidate points, which are not based on the actually inputted coordinates (what are called the coordinate candidate points forming a virtual image) and respectively correspond to both of the LR-combinations, have different coordinates due to the influence of offset of the positions of the optical units.

Thus, the coordinate values of the coordinate candidate points, which are found by the comparison among the four coordinate candidate points obtained by using the LR-combinations to substantially be equal to compared values, can be determined as those of true two input points.

Figure 25:
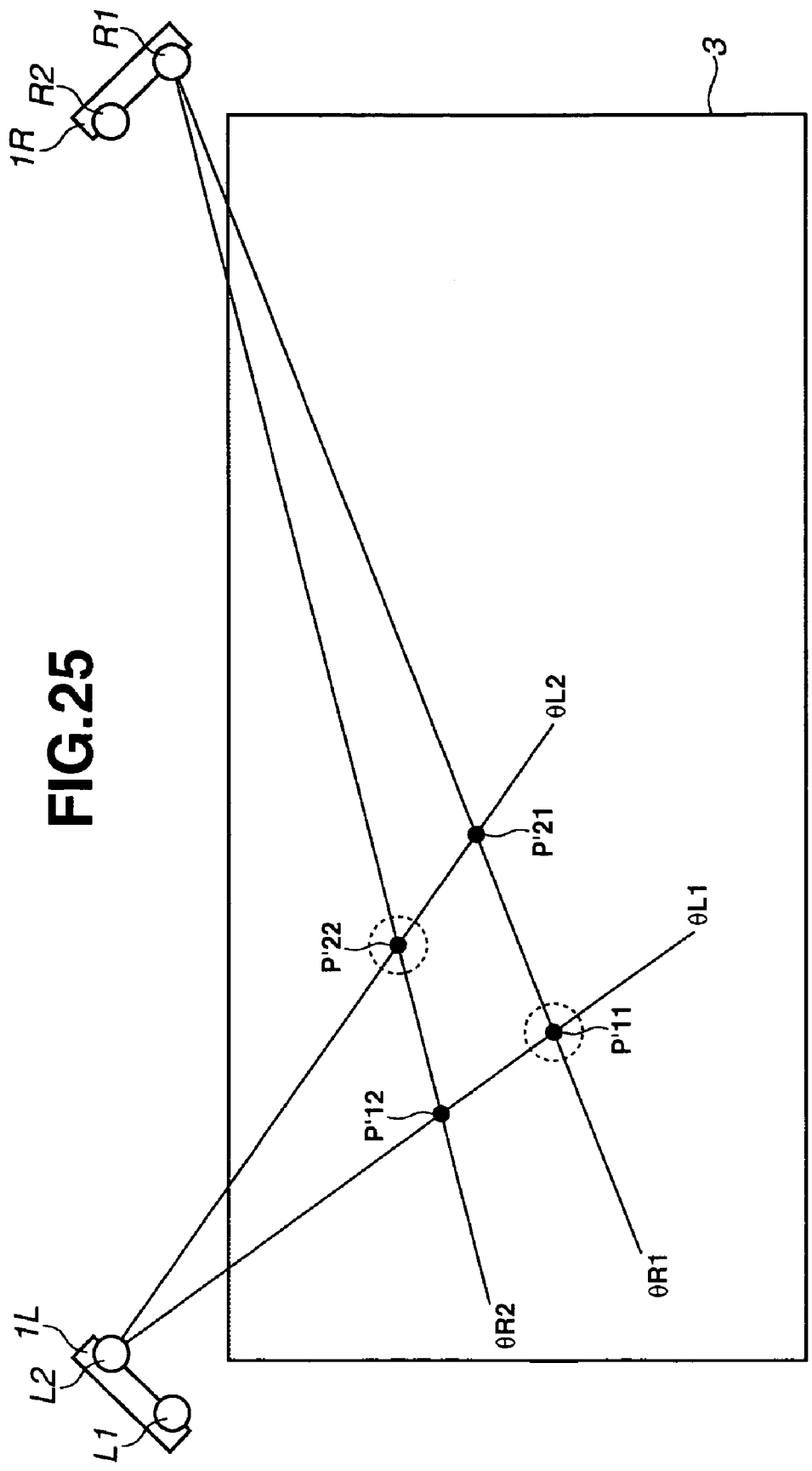
FIG. 25 is an explanatory view illustrating a coordinate calculation method according to the second exemplary embodiment.

In the case of examples shown in FIGS. 24 and 25, the candidate points P11 (P'11) and P22 (P'22) are determined as the two input points actually inputted.

Next, a coordinate calculation method [4] according to the third exemplary embodiment is described below.

Calculation Method [4]

In the detection state [4], there are no LR-combinations, for which the condition [2-2] holds, and there are two LR-combinations, for which the condition [2-1] holds.

Hereinafter, the coordinate calculation method performed in a case, in which the combination (L1, R2) corresponds to the condition [2-1] and in which the combination (L1, R1) corresponds to the condition [2-1], is described as a practical example by referring to FIGS. 14 and 15.

As illustrated in FIG. 14, the candidate points PP1 and PP2 can be determined according to the aforementioned coordinate calculation process (2) by using the optical units of the combination (L1, R2). Also, as illustrated in FIG. 15, the candidate points P11 and P22 can be determined according to the aforementioned coordinate calculation process (1) by using the optical units of the combination (L1, R1).

Thus, the two input coordinates actually inputted can approximately be determined by using the optical units of either of the LR-combinations.

In a case where overlapping-shadows are observed, according to the third exemplary embodiment, the overlapping shadows can be arranged approximately linearly in the direction of an angle ($\theta R\_c$) corresponding to a straight line passing through the centers of the overlapping shadows.

The direction of the overlapping shadows is that of the angle $\theta R\_c$ corresponding to each of the optical units R1 and R2 shown in FIGS. 14, 15, 18A and 18B.

Therefore, in either case, two points respectively corresponding to ($\theta L1s$, $\theta R\_c$) and ($\theta L2s$, $\theta R\_c$) can be determined. However, in a case where the direction of the overlapping shadows is approximated by that of the angle $\theta R\_c$ corresponding to each of the optical units R1 and R2, as is apparent from FIGS. 14 and 15, the coordinates can be more accurately determined by employing the light intensity distribution of the optical unit R1 that detects the shadows corresponding to the two input points, so that the shadows are observed to closely overlap.

Practically, as is seen from FIG. 18A, the coordinates can more accurately be calculated by employing the angle OR_c obtained from the light intensity distribution of the optical unit R1, instead of employing the angle OR_c obtained from the light intensity distribution of the optical unit R2.

In a case where the overlapping rate corresponding to the light intensity distribution of the optical unit R2 is compared with that corresponding to the light intensity distribution of the optical unit R1, as illustrated in FIG. 18A, the light intensity distribution of the optical unit corresponding to a smaller one of the widths $\Delta \theta R1\_fe$ and $\Delta \theta R2\_fe$ of the overlapping shadows is employed as the light intensity distribution corresponding to a larger overlapping rate.

Let V denote one of the optical units of one of the sensor units, which detects overlapping shadows that are associated with two inputs contemporaneously performed and that have a higher overlapping rate, a compared with shadows detected by the other optical unit. Then, two coordinates determined by an angle determined by the center of the overlapping shadows, which is detected by the optical unit V, and an angle of each of two shadows detected by one of the two optical units of the other sensor unit can be determined as two input coordinates.

Consequently, the coordinates of two points PP1 and PP2 can be calculated according to either of the combinations (L1, R2) and (L1, R1) of the optical units.

As is seen from FIGS. 14 and 15, higher precision coordinates can be calculated by using the optical units of the LR-combination, which cause shadows that more closely overlap, as compared with shadows caused by other LR-combinations.

Consequently, in the case of examples illustrated in FIGS. 14 and 15, the candidate points PP1 and PP2 shown in FIG. 15 can be determined as the actual two input points.

Results of coordinate calculation in the case of one input point or two input points, which are obtained according to one of the aforementioned coordinate calculation methods [1] to [4], are outputted to an external terminal through the serial interface 7 and are displayed as a motion or a trajectory of a cursor in an output unit, such as an image display device.

As described above, even in a case where shadows caused by two inputs overlap when observed from one of the optical units in the apparatus according to the first exemplary embodiment, according to the third exemplary embodiment, accuracy of the true or false determination is deteriorated. The accuracy of the true or false determination can be enhanced by utilizing the overlapping condition of the shadows. Consequently, regardless of whether detected shadows overlap, the true or false determination can stably be performed. In a case where a plurality of inputs can concurrently be performed, a coordinate calculation operation of the coordinate input apparatus can be stabilized and assured.

Fourth Exemplary Embodiment

A coordinate input apparatus according to a fourth exemplary embodiment can be configured so that coordinate calculation is performed by selecting one of the coordinate calculation method [1] according to the first exemplary embodiment and the coordinate calculation method [4] according to the third exemplary embodiment in accordance with a purpose and a use. Similarly, a coordinate input apparatus according to a fourth exemplary embodiment can be configured so that coordinate calculation is performed by selecting one of the coordinate calculation method [2] according to the first exemplary embodiment and the coordinate calculation method [2] according to the third exemplary embodiment according to a purpose and a use.

As compared with the coordinate calculation method [4] according to the third exemplary embodiment, the coordinate calculation method [4] according to the first exemplary embodiment is more generally described as follows.

Shadows respectively associated with concurrently inputted two points are detected by both of two optical units (for instance, optical units R1 and R2) of a first sensor unit (for example, a sensor unit 1R) to overlap with each other. Let T designates the optical unit adapted to detect the overlapping shadows having the overlapping rate that is higher than the overlapping rate of shadows detected by the other optical unit. Let U denotes the latter optical unit.

In a case where an optical unit T (the optical unit R2 in this case) is placed near to the other sensor unit, that is, a second sensor unit (for example, a sensor unit 1L), two coordinates determined by a first combination of angles (a) and (b), which are defined below, and a second combination of angles (c) and (d), which are defined below, are calculated as actual input coordinates.

The angle (a) is defined to correspond to one end portion of shadows detected by the optical unit T or U to overlap with each other, which portion is nearer to the direction of the second sensor unit than the other end portion of the shadows.

The angle (b) is defined to correspond to the shadow that is detected by one of the optical units (for example, the optical units L1 and L2) and that is nearer to the second sensor unit than the other optical unit.

The angle (c) is defined to correspond to one end portion of shadows detected by the optical unit T or U to overlap with each other, which portion is farther away from the direction of the second sensor unit than the other end portion of the shadows.

The angle (d) is defined to correspond to the shadow that is detected by one of the optical units (for example, the optical units L1 and L2) and that is farther from the direction of the second sensor unit than the other optical unit.

On the other hand, in a case where an optical unit T (the optical unit R1 in this case) is placed far from the other sensor unit, that is, a second sensor unit (for example, a sensor unit 1L), two coordinates determined by a third combination of angles (e) and (f), which are defined below, and a fourth combination of angles (g) and (h), which are defined below, are calculated as actual input coordinates.

The angle (e) is defined to correspond to one end portion of shadows detected by the optical unit T or U to overlap with each other, which portion is nearer to the direction of the second sensor unit than the other end portion of the shadows.

The angle (f) is defined to correspond to the shadow that is detected by one of the optical units (for example, the optical units L1 and L2) and that is nearer to the second sensor unit than the other optical unit.

The angle (g) is defined to correspond to one end portion of shadows detected by the optical unit T or U to overlap with each other, which portion is farther away from the direction of the second sensor unit than the other end portion of the shadows.

The angle (h) is defined to correspond to the shadow that is detected by one of the optical units (for example, the optical units L1 and L2) and that is farther away from the direction of the second sensor unit than the other optical unit.

Then, two coordinates determined by these combinations are calculated as actual input coordinates.

Although the exemplary embodiments have been described in detail in the foregoing description, the present invention can be embodied as, for example, a system, an apparatus, a method, a program, or a storage medium. Practically, the present invention can be applied to a system including a plurality of devices, and to an apparatus constituted by a single device.

Exemplary embodiments can also be implemented by supplying a software program (in the embodiment, a program corresponding to each of flowcharts illustrated in the figures), which implements the functions of the aforementioned exemplary embodiments, directly or remotely to a system or an apparatus, and reading and executing the supplied program code by a computer of the system or the apparatus.

Thus, because the functions according to at least one exemplary embodiment are implemented by a computer, the program code installed in the computer also implements at least one exemplary embodiment. That is, exemplary embodiments also cover a computer program used to implement the functions according to at least one exemplary embodiment.

In this case, in at least one exemplary embodiment the system or the apparatus has the functions of the program, the program can have any form, such as an object code, a program executed by an interpreter, or script data supplied to an operating system.

Example of storage media used to supply the program are a floppy (registered trademark) disk, a hard disk, an optical disk, a magneto-optical disk, a CD-ROM, a CD-R, a CD-RW, a magnetic tape, a non-volatile memory card, a ROM, and a DVD (a DVD-ROM and a DVD-R).

Additionally, the following method is employed to supply the program. That is, first, a client computer is connected to a website on the Internet using a browser of the client computer. Then, a computer program itself according to at least one exemplary embodiment or a compressed file of the program having an automatic installing function is downloaded to a recording medium, such as a hard disk. Alternatively, the program according to at least one exemplary embodiment is supplied by dividing the program code, which constitutes the program, into a plurality of files and by then downloading the files from different home pages. That is, at least one exemplary embodiment covers a WWW server adapted to download, to a plurality of users, the program files implementing the functions according to at least one exemplary embodiment by a computer.

Also, the functions according to at least one exemplary embodiment can be implemented by encrypting the program according to at least one exemplary embodiment, then storing the encrypted program on a storage medium, such as a CD-ROM, subsequently distributing the storage medium to users, then causing users, who meet predetermined requirements to download decryption key information from a website through the Internet, and subsequently causing the users to decrypt the encrypted program by using the key information, thereby to install the program in a computer. Alternatively, the functions according to the exemplary embodiments can be implemented by executing a program read by the computer. Alternatively, an operating system running on the computer can perform all or a part of actual processing, so that the functions of the aforementioned exemplary embodiments can be implemented by this processing.

Additionally, after the program read from the storage medium is written to a function expansion board inserted into the computer or to a memory provided in a function expansion unit connected to the computer, a CPU mounted on the function expansion board or the function expansion unit performs all or a part of the actual processing, so that the functions of the aforementioned exemplary embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-118980 filed Apr. 15, 2005, which is hereby incorporated by reference herein in its entirety.

What is claimed is:

1. A coordinate input apparatus configured to detect a position on a coordinate input region, comprising:
    a first sensor unit and a second sensor unit, each associated with one end of an edge of one side of the coordinate input region, wherein the first and second sensor units each have at least two optical units, wherein the at least two optical units includes a light projecting unit configured to project light onto the coordinate input region and a light receiving unit configured to receive incoming light;
    a detection unit configured to detect angle information representing directions of shadows, wherein shadows are areas light-shielded by two pointing instructions, according to a light amount distribution obtained from the optical units of the first and second sensor units; and
    a calculation unit configured to calculate coordinates of two positions pointed by the two pointing instructions, by using:
    1) a combination of pieces of angle information on the shadows detected by a combination of the optical units of different sensor units; and
    2) a combination of pieces of angle information on the shadows detected by a combination of the optical units of a same sensor unit.

2. The coordinate input apparatus according to claim 1, wherein in a case where all of the shadows are detected by the optical units so that none of the shadows overlap with each other, and where the calculation unit performs a calculation corresponding to the optical units of the first sensor unit, wherein the calculation unit calculates coordinates from at least one of:
   a) in a case that one of two angles based on positions of the shadows detected by the optical units of the first sensor unit, which is the angle of the shadow being far from a direction of the second sensor unit and being set to be a first angle, and that one of two angles based on positions of the shadows detected by one of the optical units of the second sensor unit, which is the angle of the shadow being far from a direction of the first sensor unit and being set to be a second angle, the calculation unit calculates coordinates determined by the first angle and the second angle as P1;
   b) in a case that one of two angles based on positions of the shadows detected by the optical units of the first sensor unit, which is the angle of the shadow being near to the direction of the second sensor unit and being set to be a first angle, and that one of two angles based on positions of the shadows detected by one of the optical units of the second sensor unit, which is the angle of the shadow being near to the direction of the first sensor unit and being set to be a second angle, the calculation unit calculates coordinates determined by the first angle and the second angle as P2;
   c) in a case that one of two angles based on positions of the shadows detected by the optical units for the first sensor unit, which is the angle of the shadow being far from the direction of the second sensor unit and being set to be a first angle, and that one of two angles based on positions of the shadows detected by one of the optical units of the second sensor unit, which is the angle of the shadow being near to the direction of the first sensor unit and being set to be a second angle, the calculation unit calculates coordinates determined by the first angle and the second angle as P3; and
   d) in a case that one of two angles based on positions of the shadows detected by the optical units for the first sensor unit, which is the angle of the shadow being near to the direction of the second sensor unit and being set to be a first angle, and that one of two angles based on positions of the shadows detected by one of the optical units of the second sensor unit, which is the angle of the shadow being far from the direction of the first sensor unit and being set to be a second angle, the calculation unit calculates coordinates determined by the first angle and the second angle as P4; and
   wherein in a case where one of the first and the second sensor units is selected according to a selection condition, where the selected sensor unit is the first sensor unit, and where one of the two optical units of the first sensor unit, which detects that the detected two shadows which are relatively close to each other, is set to be a first optical unit, and where the other optical unit is set to be a second optical unit,
   the coordinates P1 and P2 corresponding to the first sensor unit, to which the first optical unit belongs, are determined to be coordinates of the position pointed to by the two pointing instructions, in a case that the first optical unit is in the first sensor unit and is placed near to the second sensor unit, and
   the coordinates P3 and P4 corresponding to the first sensor unit, to which the first optical unit belongs, are determined to be coordinates of the position pointed to by the two pointing instructions, in a case that the first optical unit is in the first sensor unit and is placed far from the second sensor unit.

3. The coordinate input apparatus according to claim 2, wherein the sensor unit having the optical units that detects the two shadows, detects the two shadows that are closest to each other.

4. The coordinate input apparatus according to claim 2, wherein the sensor unit having the optical units that detects the two shadows, satisfy the following inequalities:

Distance (Ps-P2)<Distance (Ps-P1); and

Distance (Ps-P3)<Distance (Ps-P4).

5. The coordinate input apparatus according to claim 2, wherein the calculation unit includes a determination unit configured to determine a close state in which the two shadows are close to each other.

6. The coordinate input apparatus according to claim 5, wherein the determination unit determines a close state of the two shadows according to one of:
   a first angle corresponding to a distance between substantially middles of the two shadows;
   a second angle corresponding to a distance between inner ends of the two shadows;
   a third angle corresponding to a distance between outer ends of the two shadows;
   the second angle/the third angle; and
   the second angle/the first angle.

7. The coordinate input apparatus according to claim 1, wherein in a case where only one of the two optical units of the first sensor unit detects that the two shadows overlap, and where that one of the optical unit thereof is set to be the first optical unit, the calculation unit calculates coordinates of positions pointed to by the two pointing instructions by using angles of the shadows, both of which are close to directions of both the sensor units, and also using angles of the shadows, both of which are far from directions of both the sensor units, among the shadows detected by the two optical units of the first and second sensor units in a case that the first optical unit is placed at a side, which is near to the second sensor unit, in the first sensor unit, and wherein in a case where only one of the two optical units of the first sensor unit detects that the two shadows overlap, and
   where that one of the optical units thereof is set to be the first optical unit, the calculation unit calculates coordinates of positions pointed to by the two pointing instructions by using two combinations of the shadows, one of which is close to the directions of both the sensor units, and the other of which is far from the direction of both the sensor units, among the shadows detected by the two optical units of the first and second sensor units in a case that the first optical unit is placed at a side, which is far from the second sensor unit, in the first sensor unit.

8. The coordinate input apparatus according to claim 1, wherein the calculation unit calculates, in a case where each of the two optical units of the first sensor unit detects that the shadows overlap and where one of the optical units of the first sensor unit, which detects the shadows whose overlapping rate is larger than that of the shadows detected by the other optical unit of the first sensor unit, is set to be the first optical unit, wherein coordinates of the positions pointed to by the two pointing instructions are calculated by using an angle corresponding to a substantial center of the overlapping shadows detected by the first optical unit, and also using an angle of the two shadows, which is detected by one of the two optical units of the second sensor unit.

9. The coordinate input apparatus according to claim 8, wherein the overlapping-rate is a ratio between angular widths determined by a difference between an angle corresponding to one end portion of each of the overlapping shadows and an angle corresponding to the other end portion thereof.

10. The coordinate input apparatus according to claim 1, wherein in a case where each of two optical units of the first sensor unit detects that two shadows overlap with each other, wherein one of the two optical units detecting the overlapping shadows, whose overlapping rate is larger, is set to be a first optical unit, and where the optical unit detecting the overlapping shadows, whose overlapping rate is smaller, is set to be a second optical unit, wherein the calculation unit calculates coordinates from at least one of:
  a) in a case that the first optical unit is placed at a side, which is near to the second sensor unit, in the first sensor unit, the calculation unit calculates coordinates of positions pointed by the two pointing instructions by using a first combination of 1) an angle corresponding to an end portion of the overlapping shadows detected by the first or second optical unit, which portion is near to a direction of the second sensor unit, and 2) an angle of one of shadows detected by the two optical units of the second sensor unit to be near to the direction of the second sensor unit, and by also using a second combination of 3) an angle corresponding to an end portion of the overlapping shadows detected by the first or second optical unit, which portion is far from a direction of the second sensor unit, and 4) an angle of one of shadows detected by the two optical units of the second sensor unit to be far from the direction of the second sensor unit, and
  b) in a case that the first optical unit is placed at a side, which is far from the second sensor unit, in the first sensor unit, the calculation unit calculates coordinates of positions pointed by the two pointing instructions by using a third combination of 5) an angle corresponding to an end portion of the overlapping shadows detected by the first or second optical unit, which portion is near to a direction of the second sensor unit, and 6) an angle of one of shadows detected by the two optical units of the second sensor unit to be far from the direction of the second sensor unit, and by also using a fourth combination of 7) an angle corresponding to an end portion of the overlapping shadows detected by the first or second optical unit, which portion is far from a direction of the second sensor unit, and 8) an angle of one of shadows detected by the two optical units of the second sensor unit to be near to the direction of the second sensor unit.

11. The coordinate input apparatus according to claim 10, wherein the overlapping rate is a ratio between angular widths determined by a difference between an angle corresponding to one end portion of each of the overlapping shadows and an angle corresponding to the other end portion thereof.

12. The coordinate input apparatus according to claim 10, wherein the angle corresponding to the end portion is an angle corresponding to a position shifted to the center of the overlapping shadows from each of both end portions of the shadows, which are detected to overlap with each other, by an angular amount corresponding to a diameter of one of the two pointing instructions.

13. A method of controlling a coordinate input apparatus configured to detect a position pointed on a coordinate input region by using first and second sensor units, each associated with one end of an edge of one side of the coordinate input region, wherein the first and second sensor units each have at least two optical units, wherein the at least two optical units includes a light projecting unit configured to project light onto the coordinate input region and a light receiving unit configured to receive incoming light, comprising:
  a detection step of detecting angle information representing directions of shadows, which are areas light-shielded by two pointing instructions, according to a light amount distribution obtained from the optical units of the first and second sensor units; and
  a calculation step of calculating coordinates of two positions pointed by the two pointing instructions, by using:
    1) a combination of pieces of angle information on the shadows detected by a combination of the optical units of the different sensor units; and
    2) a combination of pieces of angle information on the shadows detected by a combination of the optical units of a same sensor unit.

14. A storage medium for storing a computer program configured to implement control of a coordinate input apparatus configured to detect a position pointed on a coordinate input region by using first and second sensor units, each associated with one end of an edge of one side of the coordinate input region, wherein the first and second sensor units each have at least two optical units, wherein the at least two optical units includes a light projecting unit configured to project light onto the coordinate input region and a light receiving unit configured to receive incoming light, comprising:
  a program code configured to perform a detection step of detecting angle information representing directions of shadows, which are areas of light-shielded by two pointing instructions, according to a light amount distribution obtained from the optical units of the first and second sensor units; and
  a program code configured to perform a calculation step of calculating coordinates of two positions pointed by the two pointing instructions, by using:
    1) a combination of pieces of angle information on the shadows detected by a combination of the optical units of the different sensor units; and
    2) a combination of pieces of angle information on the shadows detected by a combination of the optical units of a same sensor unit.

15. The coordinate input apparatus according to claim 3, wherein the calculation unit includes a determination unit configured to determine a close state in which the two shadows are close to each other.

16. The coordinate input apparatus according to claim 15, wherein the determination unit determines a close state of the two shadows according to one of:
  a first angle corresponding to a distance between substantially middles of the two shadows;
  a second angle corresponding to a distance between inner ends of the two shadows;
  a third angle corresponding to a distance between outer ends of the two shadows;
  the second angle/the third angle; and
  the second angle/the first angle.

17. A coordinate detection device comprising:
  a first pointing means having a first thickness that blocks a portion of incident light forming a first shadow, wherein the first pointing means identifies a first coordinate on a coordinate region;
  a second pointing means having a second thickness that blocks a portion of incident light forming a second shadow, wherein the second pointing means identifies a second coordinate on the coordinate region;

a first sensor unit, wherein the first sensor unit can distinguish between incident light entering at different angles with respect to the front of the first sensor unit, and wherein the first shadow and second shadow have an associated first shadow first unit angle and second shadow first unit angle detected in the first sensor unit;

a second sensor unit, wherein the second sensor unit can distinguish between incident light entering at different angles with respect to the front of the second sensor unit, and wherein the first shadow and second shadow have an associated first shadow second unit angle and second shadow second unit angle detected in the second sensor unit; and a calculation unit that calculates the first and second coordinate based upon the first shadow first unit angle, the first shadow second unit angle, the second shadow first unit angle and the second shadow second unit angle.

* * * * *